United States Patent
Larkin et al.

(10) Patent No.: US 12,386,637 B2
(45) Date of Patent: Aug. 12, 2025

(54) INTELLIGENT AUTOMATIC ORCHESTRATION OF MACHINE-LEARNING BASED PROCESSING PIPELINE

(71) Applicant: Optum Services (Ireland) Limited, Dublin (IE)

(72) Inventors: Kevin Larkin, Dublin (IE); Mark Tonge, Dublin (IE); Anthony R. O'Neill, Dublin (IE); Conor Breen, Dublin (IE); Peter Cogan, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 422 days.

(21) Appl. No.: 17/937,906

(22) Filed: Oct. 4, 2022

(65) Prior Publication Data

US 2024/0111551 A1    Apr. 4, 2024

(51) Int. Cl.
| | |
|---|---|
| *G06F 7/00* | (2006.01) |
| *G06F 9/448* | (2018.01) |
| *G06F 9/455* | (2018.01) |
| *G06N 20/00* | (2019.01) |

(52) U.S. Cl.
CPC ........ *G06F 9/4484* (2018.02); *G06F 9/45516* (2013.01); *G06N 20/00* (2019.01)

(58) Field of Classification Search
CPC .... G06F 9/4484; G06F 9/45516; G06N 20/00
USPC .................................................. 707/600–899
See application file for complete search history.

(56) References Cited

U.S. PATENT DOCUMENTS

| | | |
|---|---|---|
| 7,788,115 B2 | 8/2010 | Flam et al. |
| 8,321,243 B1 | 11/2012 | Harris, Sr. et al. |
| 10,510,046 B2 | 12/2019 | Whittier et al. |
| 2002/0049617 A1 | 4/2002 | Lencki et al. |
| 2015/0006188 A1 | 1/2015 | Pummill |
| 2015/0205924 A1 | 7/2015 | McMakin |
| 2015/0317337 A1 | 11/2015 | Edgar |

(Continued)

OTHER PUBLICATIONS

Quinn, Katie J. et al. "Data Descriptor: A Dataset Quantifying Polypharmacy in the United States," Scientific Data, vol. 4, No. 170167, Oct. 31, 2017, pp. 1-11, DOI: 10.1038/sdata.2017.167.

(Continued)

*Primary Examiner* — Isaac M Woo
(74) *Attorney, Agent, or Firm* — Alston & Bird LLP

(57) ABSTRACT

Various embodiments of the present invention disclose techniques for orchestrating a complex data processing scheme for an investigative process using a machine-learning based orchestration model that is trained to optimize the use of computing resources based at least in part on a feedback loop. An input data object associated with an investigative process can be selected for investigation; a predictive data analysis sub-routine for processing the input data object can be intelligently selected from a plurality of predictive data analysis sub-routines by the machine-learning based orchestration model; and a processing orchestration action can be initiated based at least in part on an investigative score output by the predictive data analysis sub-routine. The processing orchestration action can include closing the input data object, continuing to process the input data object with additional predictive data analysis sub-routines, or passing the input data object to a predictive entity for further processing.

20 Claims, 7 Drawing Sheets

(56) References Cited

U.S. PATENT DOCUMENTS

2019/0236465 A1* 8/2019 Vleugels ............... G16H 10/60
2020/0143946 A1 5/2020 Lewis
2020/0364816 A1 11/2020 Kapur et al.
2021/0240556 A1 8/2021 Breen et al.
2021/0241378 A1 8/2021 Magnuson et al.

OTHER PUBLICATIONS

Sabrie, Hilda Yunita et al. The Implementation of Coordination of Benefit (COB) Within Indonesian National Health Insurance System (BPJS Kesehatan), In Proceedings of the International Law Conference (IN-LAC2018)—Law, Technology and the Imperative of Change in the 21st Century, pp. 18-23, (Year: 2020), DOI: 10.5220/0010051000180023.

* cited by examiner

INTELLIGENT AUTOMATIC ORCHESTRATION OF MACHINE-LEARNING BASED PROCESSING PIPELINE

BACKGROUND

Various embodiments of the present invention address technical challenges related to complex data processing techniques given limitations of existing predictive data analysis processes. In doing so, various embodiments of the present invention make important contributions to various existing predictive data analysis systems.

BRIEF SUMMARY

Various embodiments of the present invention disclose techniques for orchestrating a complex data processing scheme for an investigative process using a machine-learning based orchestration model that is trained to optimize the use of computing resources based at least in part on a feedback loop. In some embodiments, the machine-learning based orchestration model includes multiple sub-models that can be jointly trained using an overall loss function designed to optimize computing performance and allocation of computing resources. The sub-models can each be trained using unique sets of training data to optimize a different portion of an investigative process. Using some of the techniques described herein, a proposed system can intelligently direct computing resources to overcome the limitations of existing data processing techniques and improve efficiency of an investigative process.

In accordance with one embodiment, a computer-implemented method for optimizing an execution of a plurality of predictive data analysis sub-routines is provided. The computer-implemented method comprises generating, using one or more processors, an input data object profile for an input data object associated with an investigative process, wherein the input data object profile comprises one or more initial input data object profile parameters of a plurality of input data object profile parameters that describe a plurality of attributes for the input data object; selecting, using the one or more processors and a machine-learning based orchestration model, a first predictive data analysis sub-routine from the plurality of predictive data analysis sub-routines based at least in part on the one or more initial input data object profile parameters; generating, using the one or more processors and the first predictive data analysis sub-routine, (i) an investigative score for the input data object and (ii) at least one additional input data object profile parameter for the input data object profile; and initiating, based at least in part on the investigative score and the at least one additional input data object profile parameter, using the one or more processors and the machine-learning based orchestration model, a processing orchestration action, the processing orchestration action comprising at least one of: (i) selecting, using the one or more processors and the machine-learning based orchestration model, a second predictive data analysis sub-routine from the plurality of predictive data analysis sub-routines based at least in part on the one or more initial input data object profile parameters and the at least one additional input data object profile parameter; or (ii) determining, based at least in part on the investigative score and the input data object profile for the input data object, using the one or more processors and the machine-learning based orchestration model, a predictive entity for performing the investigative process for the input data object.

In accordance with another embodiment, an apparatus for optimizing an execution of a plurality of predictive data analysis sub-routines is provided. The apparatus comprises at least one processor and at least one memory including program code, the at least one memory and the program code are configured to, with the processor, cause the apparatus to at least: generate an input data object profile for an input data object associated with an investigative process, wherein the input data object profile comprises one or more initial input data object profile parameters of a plurality of input data object profile parameters that describe a plurality of attributes for the input data object; select, using a machine-learning based orchestration model, a first predictive data analysis sub-routine from the plurality of predictive data analysis sub-routines based at least in part on the one or more initial input data object profile parameters; generate, using the first predictive data analysis sub-routine, (i) an investigative score for the input data object and (ii) at least one additional input data object profile parameter for the input data object profile; and initiate, based at least in part on the investigative score and the at least one additional input data object profile parameter, using the machine-learning based orchestration model, a processing orchestration action, the processing orchestration action comprising at least one of: (i) selecting, using the machine-learning based orchestration model, a second predictive data analysis sub-routine from the plurality of predictive data analysis sub-routines based at least in part on the one or more initial input data object profile parameters and the at least one additional input data object profile parameter; or (ii) determining, based at least in part on the investigative score and the input data object profile for the input data object, using the machine-learning based orchestration model, a predictive entity for performing the investigative process for the input data object.

In accordance with yet another embodiment, a computer program product for optimizing an execution of a plurality of predictive data analysis sub-routines is provided. The computer program product comprises at least one non-transitory computer-readable storage medium having computer-readable program code portions stored therein. The computer-readable program code portions are configured to: generate an input data object profile for an input data object associated with an investigative process, wherein the input data object profile comprises one or more initial input data object profile parameters of a plurality of input data object profile parameters that describe a plurality of attributes for the input data object; select, using a machine-learning based orchestration model, a first predictive data analysis sub-routine from the plurality of predictive data analysis sub-routines based at least in part on the one or more initial input data object profile parameters; generate, using the first predictive data analysis sub-routine, (i) an investigative score for the input data object and (ii) at least one additional input data object profile parameter for the input data object profile; and initiate, based at least in part on the investigative score and the at least one additional input data object profile parameter, using the machine-learning based orchestration model, a processing orchestration action, the processing orchestration action comprising at least one of: (i) selecting, using the machine-learning based orchestration model, a second predictive data analysis sub-routine from the plurality of predictive data analysis sub-routines based at least in part on the one or more initial input data object profile parameters and the at least one additional input data object profile parameter; or (ii) determining, based at least in part on the investigative score and the input data object profile for the input data object, using the machine-learning based orchestration model, a predictive entity for performing the investigative process for the input data object.

In accordance with an embodiment of the present disclosure, a computer-implemented method for optimizing a plurality of machine-learning based models for an end-to-end investigative process is provided. The computer-implemented method comprises generating, using one or more processors, an input data object profile for an input data object associated with the investigative process; selecting, using the one or more processors and a first machine-learning based model, a predictive data analysis sub-routine from a plurality of predictive data analysis sub-routines based at least in part on the input data object profile; generating, using the one or more processors and the predictive data analysis sub-routine, an investigative score for the input data object profile; determining, using the one or more processors and a second machine-learning based model, a predictive entity for performing the investigative process based at least in part on the investigative score and the input data object profile; receiving, by the one or more processors, an investigative outcome from the predictive entity; augmenting, using the one or more processors, a historical optimization data object with at least one of the input data object profile, the predictive data analysis sub-routine, the predictive entity, or the investigative outcome; and updating, using the one or more processors, one or more parameters for the first machine-learning based model and the second machine-learning based model based at least in part on the historical optimization data object.

In accordance with another embodiment of the present disclosure, an apparatus for optimizing a plurality of machine-learning based models for an end-to-end investigative process is provided. The apparatus comprises at least one processor and at least one memory including program code, the at least one memory and the program code are configured to, with the at least one processor, cause the apparatus to at least generate an input data object profile for an input data object associated with the investigative process; select, using a first machine-learning based model, a predictive data analysis sub-routine from a plurality of predictive data analysis sub-routines based at least in part on the input data object profile; generate, using the predictive data analysis sub-routine, an investigative score for the input data object profile; determine, using a second machine-learning based model, a predictive entity for performing the investigative process based at least in part on the investigative score and the input data object profile; receive an investigative outcome from the predictive entity; augment a historical optimization data object with at least one of the input data object profile, the predictive data analysis sub-routine, the predictive entity, or the investigative outcome; and update one or more parameters for the first machine-learning based model and the second machine-learning based model based at least in part on the historical optimization data object.

In accordance with yet another embodiment of the present disclosure, a computer program product for optimizing a plurality of machine-learning based models for an end-to-end investigative process is provided. The computer program product comprises at least one non-transitory computer-readable storage medium having computer-readable program code portions stored therein. The computer-readable program code portions are configured to: generate an input data object profile for an input data object associated with the investigative process; select, using a first machine-learning based model, a predictive data analysis sub-routine from a plurality of predictive data analysis sub-routines based at least in part on the input data object profile; generate, using the predictive data analysis sub-routine, an investigative score for the input data object profile; determine, using a second machine-learning based model, a predictive entity for performing the investigative process based at least in part on the investigative score and the input data object profile; receive an investigative outcome from the predictive entity; augment a historical optimization data object with at least one of the input data object profile, the predictive data analysis sub-routine, the predictive entity, or the investigative outcome; and update one or more parameters for the first machine-learning based model and the second machine-learning based model based at least in part on the historical optimization data object.

BRIEF DESCRIPTION OF THE DRAWINGS

Figure 1:
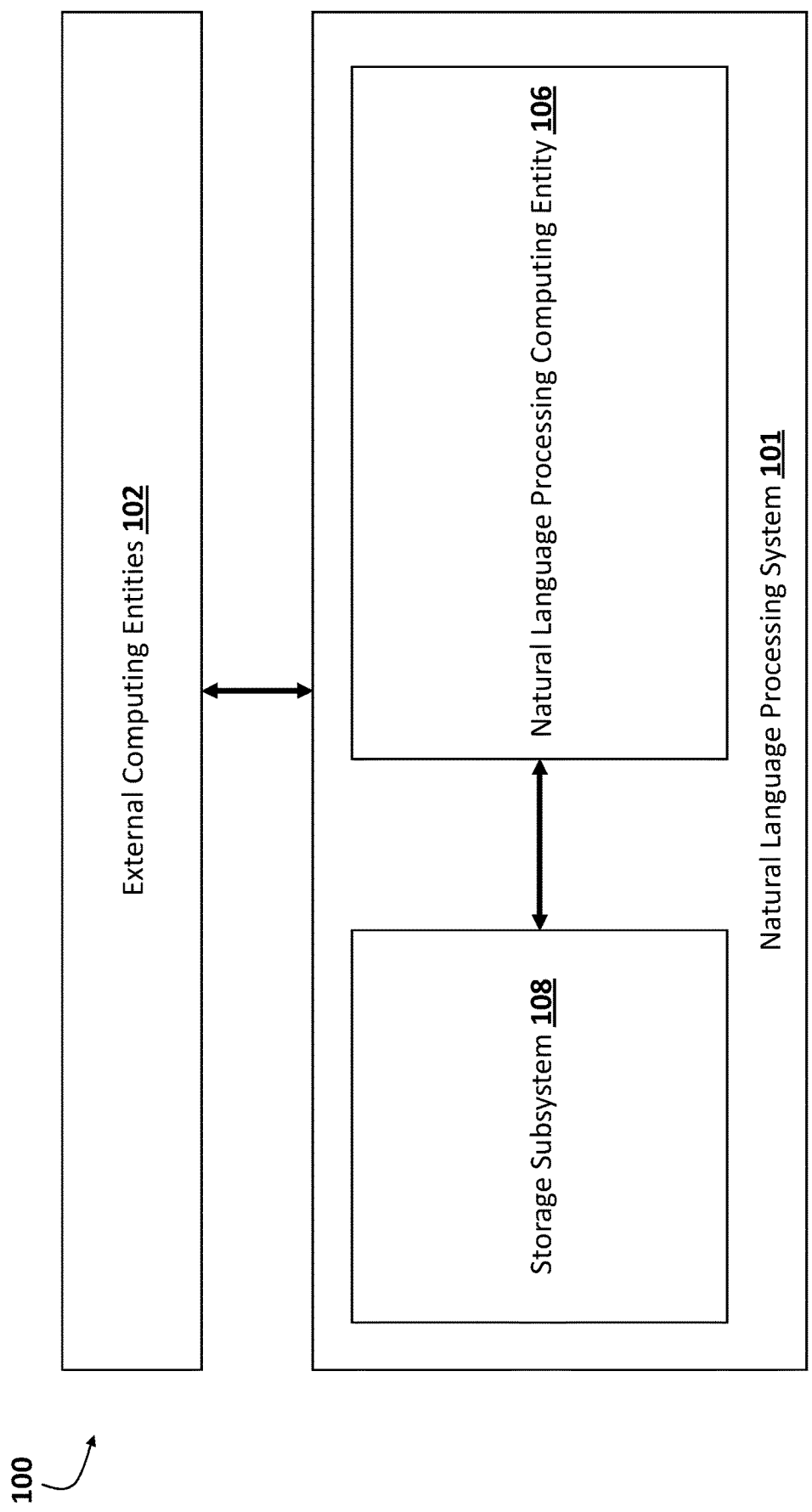

Having thus described the invention in general terms, reference will now be made to the accompanying drawings, which are not necessarily drawn to scale, and wherein:

FIG. 1 provides an exemplary overview of a system that can be used to practice embodiments of the present invention.

Figure 2:
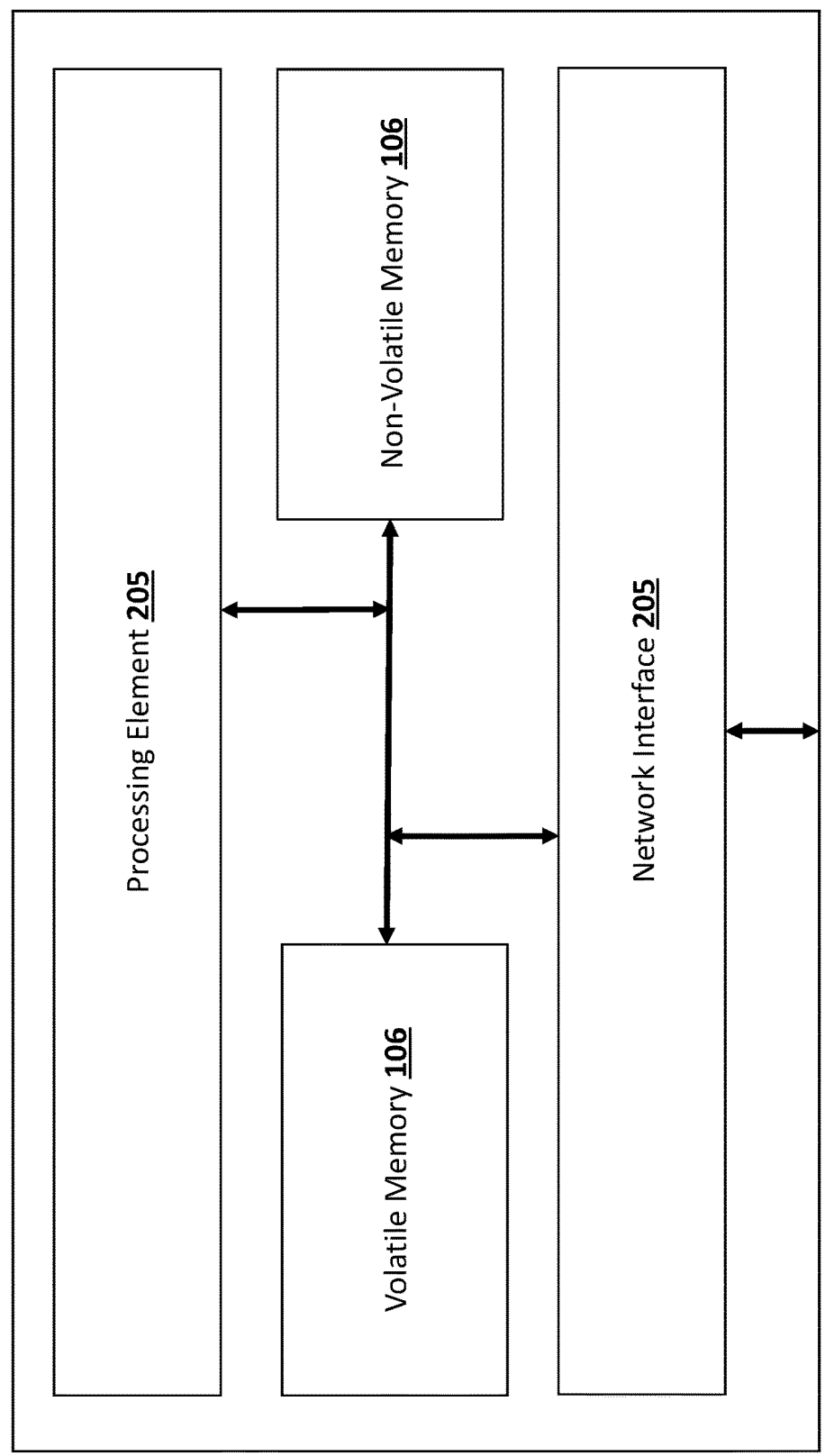

FIG. 2 provides an example predictive data analysis computing entity in accordance with some embodiments discussed herein.

Figure 3:
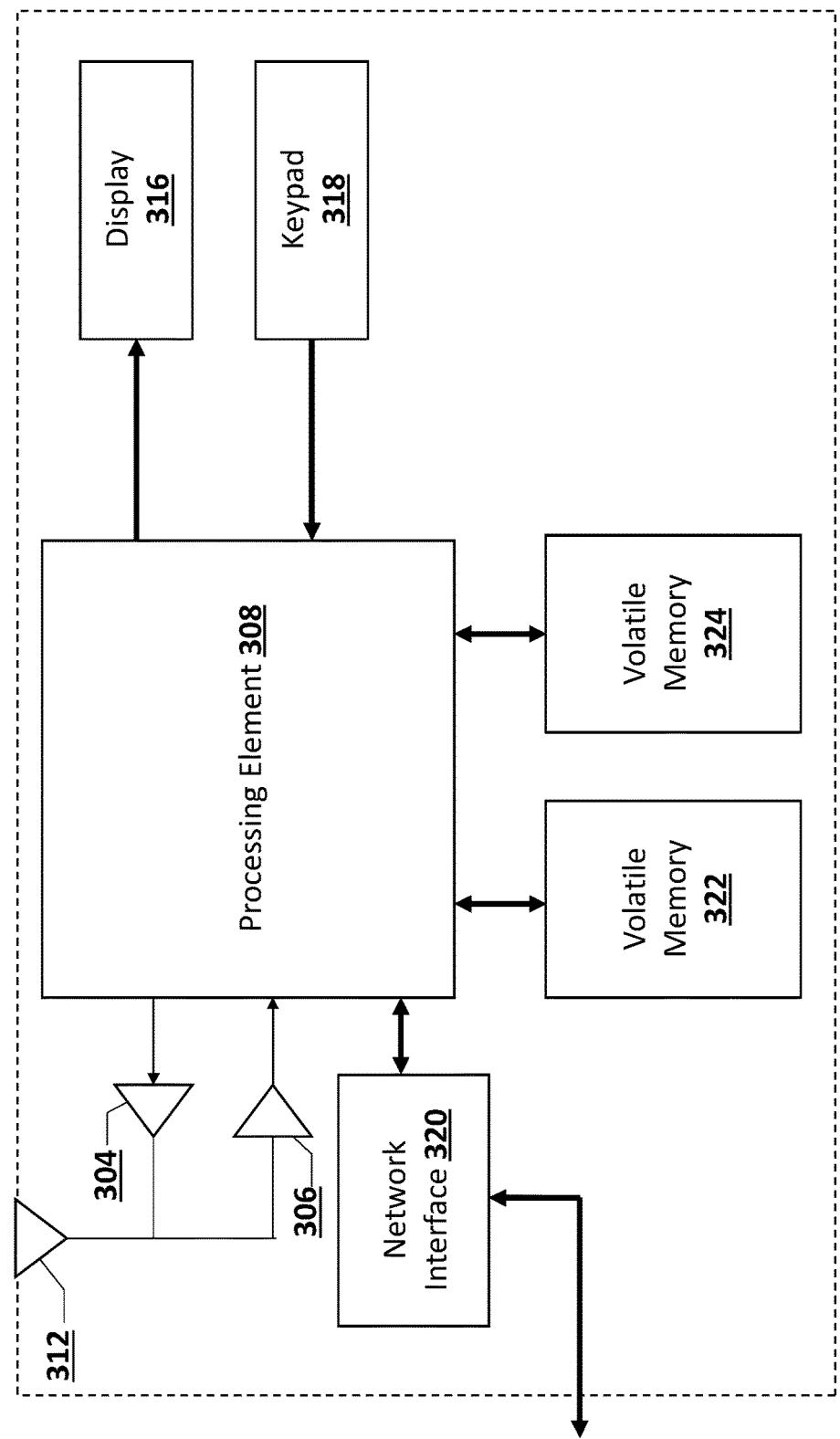

FIG. 3 provides an example external computing entity in accordance with some embodiments discussed herein.

Figure 4:
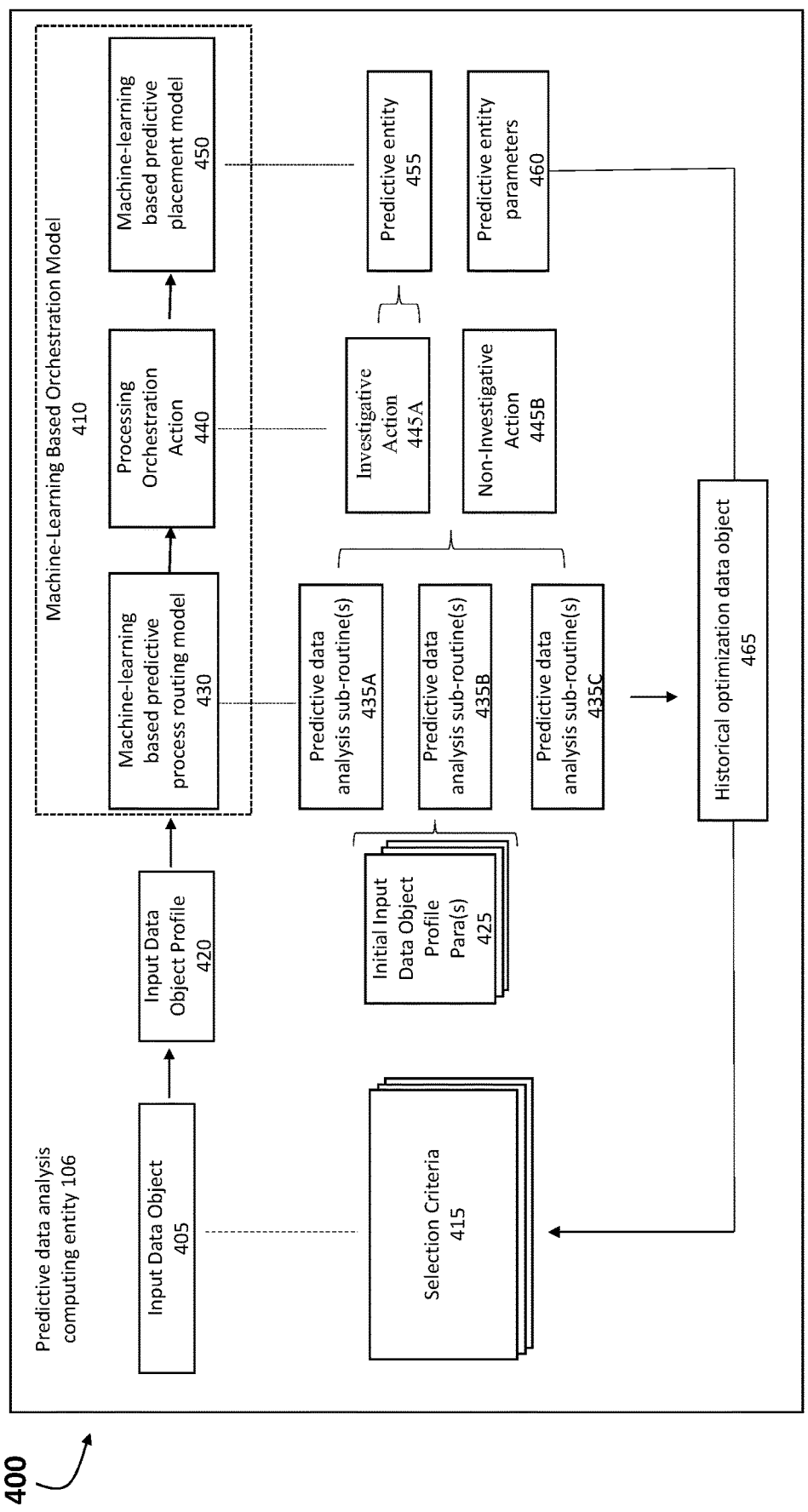

FIG. 4 provides a dataflow diagram of an example process for intelligently processing an input data object using a machine-learning based orchestration model in accordance with some embodiments discussed herein.

Figure 5:
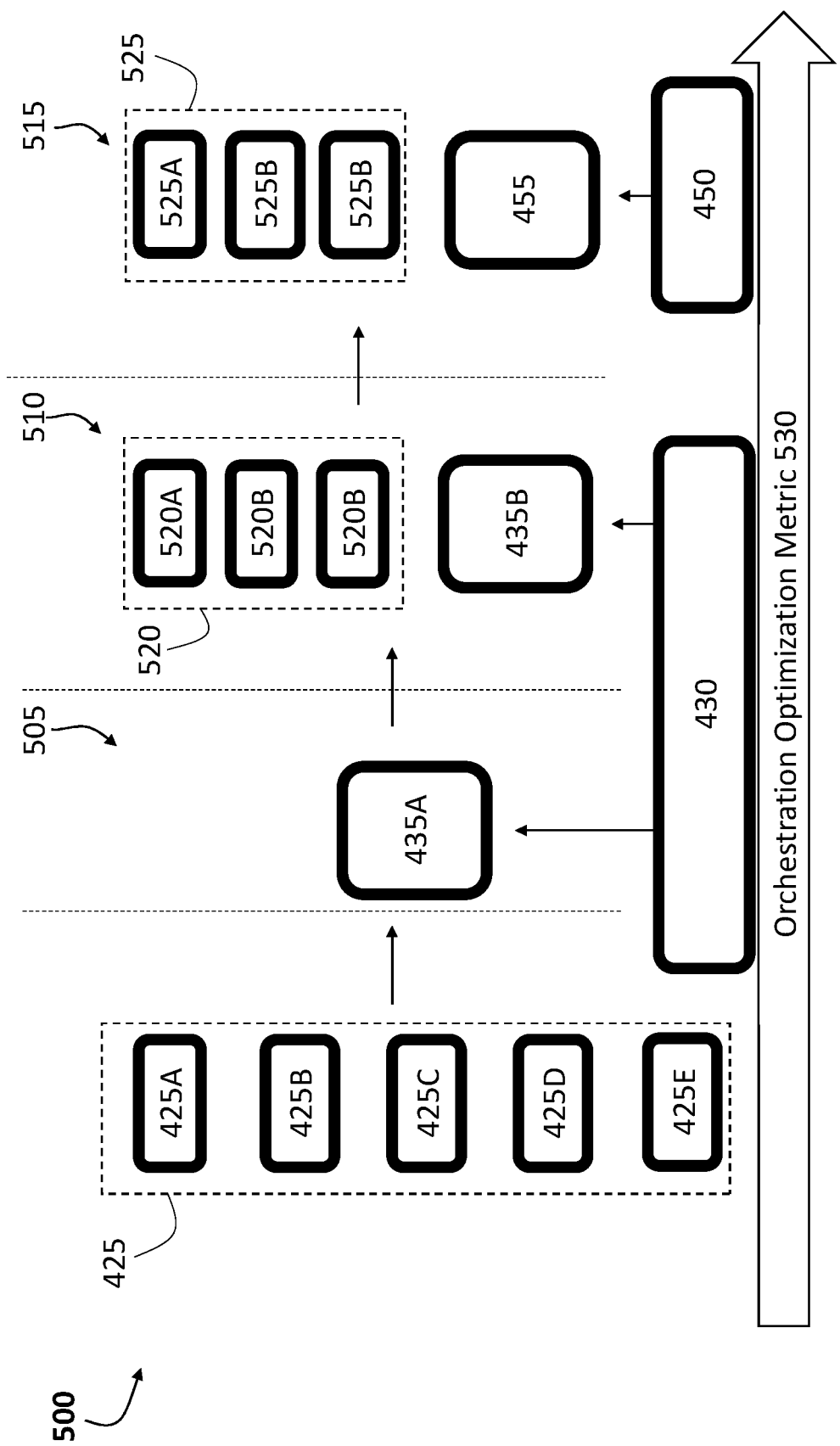

FIG. 5 provides an operational example of a process for iteratively processing an input data object using machine-learning based models in accordance with some embodiments discussed herein.

Figure 6:
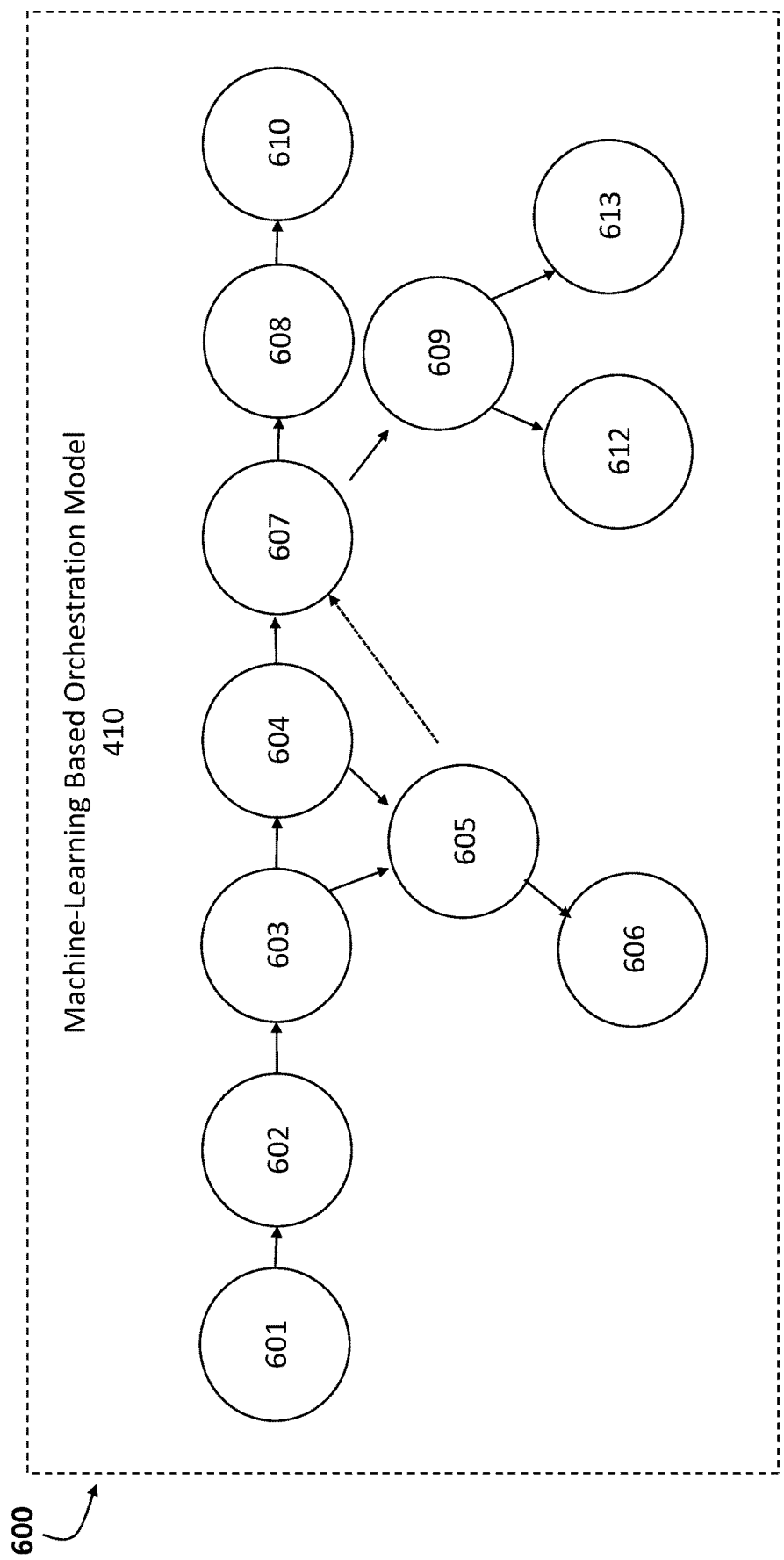

FIG. 6 provides an operational example for intelligently processing an input data object using a machine-learning based orchestration model in accordance with some embodiments discussed herein.

Figure 7:
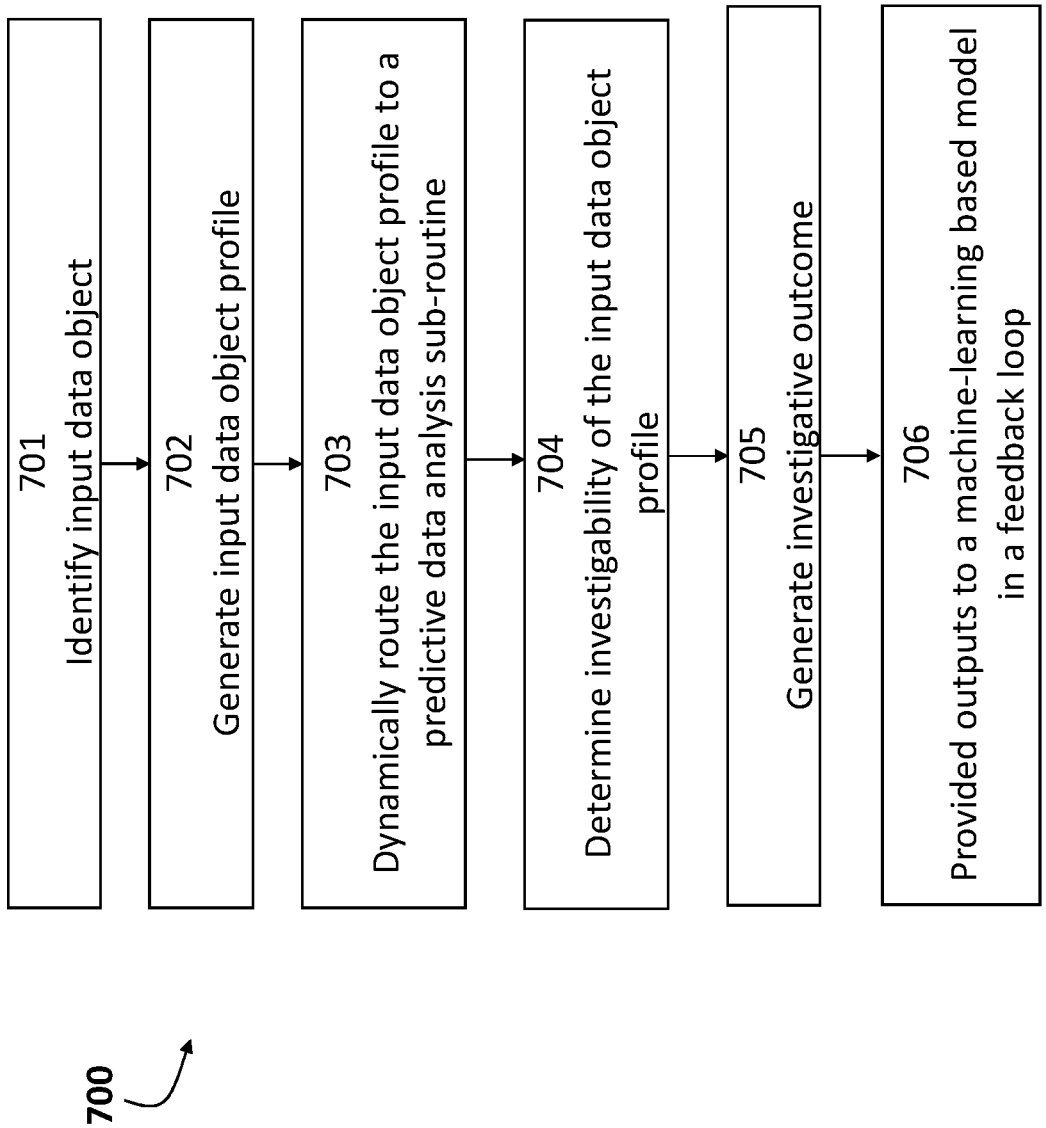

FIG. 7 provides a flowchart diagram of an example process for intelligently processing an input data object using a machine-learning based orchestration model in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Terms such as "computing," "determining," "generating," and/or similar words are used herein interchangeably to refer to the creation, modification, or identification of data. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW AND TECHNICAL ADVANTAGES

Embodiments of the present invention present new data processing techniques to improve computer resource allocation for processing complex and robust sets of data for an investigative process. To do so, the present disclosure describes a machine-learning based orchestration model that is trained to intelligently orchestrate a data processing scheme for an investigative process. The machine-learning based orchestration model includes a new machine-learning based architecture with multiple different models jointly trained to optimize both computer performance and the efficiency of an investigative process. Moreover, the machine-learning based orchestration model is trained using new training techniques that allow one or more sub-components of the model to be individually trained using training sets tailored to each portion of the investigative process.

More particularly, according to some embodiments of the present invention, a machine-learning based orchestration model is provided for orchestrating a complex data processing scheme. The complex data processing can involve an investigative process such as, for example, a coordination of benefits ("COB") process, that can have a multitude of different processing capabilities that are each tailored for specific use cases. Investigative processes can be time sensitive, preventing the predominant use of manual decision making. To accommodate for these time restrictions, a plurality of different automated and manual processing techniques are utilized to identify data objects that may be of interest for the investigative process. Each processing technique can be more or less efficient for different data objects depending on the specific circumstances for the data object. The machine-learning based orchestration model improves the use of these processing techniques by routing a data object to a technique that is most likely to achieve an investigative outcome at a time that the technique is most likely to achieve the investigative outcome. In this manner, the machine-learning based orchestration model can be trained to maximize the performance of different computing resources while reducing waste.

According to some embodiments of the present invention, a new machine-learning based architecture and training techniques are provided for generating the machine-learning based orchestration model. The new machine-learning based architecture can include an overall model with a plurality of sub-models that are partially jointly trained and independently trained to optimize different portions of an investigative process with a common goal of optimizing overall system performance. The machine-learning based architecture includes a machine-learning based orchestration model with at least (i) a first process routing sub-model, a machine-learning based predictive process routing model, that is at least partially individually trained to select an optimal predictive data analysis sub-routine for processing a data object, and (ii) a second entity placement sub-model, a machine-learning based predictive placement model, that is at least partially individually trained to select an optimal predictive data entity for processing a data object. Each model can be trained using a training set that is tailored for optimizing a different portion of the investigative process based at least in part on a joint loss function for optimizing overall system performance.

Training data, a historical optimization data object, can be automatically generated at each stage of the investigative process to continually optimize the machine-learning based orchestration model's performance. For instance, as the machine-learning based orchestration model develops, the results and outcomes can feed back into the machine-learning based orchestration model in a continuous loop such that it continues to learn and develop best routing algorithms for the investigative process.

Exemplary inventive and technologically advantageous embodiments of the present invention include: (i) techniques for intelligently routing a data object through a plurality of different processing resources to optimize computing performance; (ii) techniques for generating a machine-learning based model for optimizing multiple portions of an end-to-end investigative process; and (iii) training techniques for training the machine-learning based model using a continuous feedback loop.

II. DEFINITIONS OF CERTAIN TERMS

The term "input data object" may refer to a data entity that describes an input to a machine-learning based model. The machine-learning based model can include a data processing algorithm for an investigative process. The input data object can be associated with the investigative process. The input data object, for example, can include a data entity that identifies an object of interest that may be involved in the investigative process. The investigative process can include a process in which large amounts of data is analyzed to identify an irregularity that, once identified, may be addressed. An example investigative process can include a coordination of benefits process by which a health insurance payer determines if it should be the primary or secondary payer of medical claims for a member who is covered by more than one health insurance policy at the same time. In this case, the input data object can refer to a data entity that describes a member of interest for a COB process that may (i) have a medical claim and (ii) be covered by multiple policies. Other examples of investigative processes can include: (i) fraud investigations in which the input data object can refer to a data entity that describes a potentially fraudulent claim, (ii) overpayment investigations in which the input data object can refer to a data entity that describes a potentially unnecessary payment, and/or the like.

In some embodiments, the input data object can be selected from a plurality of similar data entities based at least in part on selection criteria that identify the input data object as an object of interest. This can beneficially direct machine-learning resources to input data objects with a higher likelihood of having an investigative outcome. For instance, in the case that the investigative process is a COB process, the input data object can be selected based at least in part on claim-based information. An input data object, for example, can refer to a data entity that describes a member that has created a new claim, has a probability of making a claim, has a retroactive claim, and/or is otherwise a prospective member of interest.

The term "input data object profile" may refer to a data entity that describes a data structure for storing information for an input data object. The input data object profile can include a plurality of input data object profile parameters for the input data object. The input data object profile can be modified as the input data object progresses through a data processing scheme. The input data object profile, for example, can be populated with one or more different input data object profile parameters at one or more iterations of the data processing scheme. In some embodiments, the input data object profile can be initially populated with initial input data object profile parameters and then augmented with additional input data object profile parameters. The input data object profile can be processed by the machine-learning based model to determine whether an input data object should be investigated or closed. In the event that the input data object should be investigated, the input data object profile can be assigned a case identifier and provided to a predictive entity for further processing. In the event that the input data object should not be investigated, the input data object profile can be closed.

The term "input data object profile parameter" may refer to a data entity that describes a component of an input data object profile. The input data object profile parameters can be descriptive of a plurality of attributes for an input data object. The plurality of attributes can include one or more characteristics that may be relevant to an investigative process. In this respect, the plurality of attributes can be based at least in part on the investigative process. As an example, examples of a plurality of input data object profile parameters for a COB process can include an identification of an insurance carrier, another insurance ("OI") carrier, an OI subscriber, a member name, a state of residence, the presence of and/or names for one or more dependents, a relationship, and/or the like.

As described herein, an input data object can be associated with each of the input data object profile parameters, but only a subset of the parameters can be known at a given time. An input data object profile, for example, can include a subset of known input data object profile parameters for the input data object. This subset can be augmented during an investigative process as additional parameters are derived for the input data object. At any given time, the subset of parameters stored by the input data object profile can impact the efficacy of a predictive data analysis sub-routine in analyzing the input data object for the investigative process. Knowledge of the known input data object profile parameters can be utilized to intelligently route the input data object profile through a data processing scheme.

The term "machine-learning based orchestration model" may refer to a data entity that describes parameters, hyper-parameters, and/or defined operations of a machine-learning based model (e.g., model including at least one of one or more rule-based layers, one or more layers that depend on trained parameters, etc.). The machine-learning based orchestration model can be trained to intelligently orchestrate the processing of data input elements for an investigative process. The machine-learning based orchestration model, for example, can intelligently direct an input data object through a data processing scheme in an investigative process based at least in part on best predicted outcomes, resources, timelines, and varying capabilities of automated processes available to the data processing scheme.

The machine-learning based orchestration model can leverage input data objects and/or input data object profile parameters to intelligently direct an input data object profile between different automated capabilities that can process the profile with maximum probability of success. The machine-learning based orchestration model can continually reassess the input data object profile as it is augmented with additional input data object profile parameters to make a determination based at least in part on statistical learning, of where best to direct the input data object profile to maximize potential investigative identifications. The machine-learning based orchestration model can direct the input data object profile through multiple iterations of the data processing scheme. At each iteration, the input data object profile can be augmented with additional information, rescored based at least in part on the new information, and then redirected.

After each iteration, the machine-learning based orchestration model can generate an investigative score of the input data object and initiate a processing orchestration action based at least in part on the investigative score. The processing orchestration action can be indicative of the performance of another iteration (e.g., to improve the investigative score), a determination that the input data object qualifies for an investigative process, and/or a determination that the input data object does not qualify for the investigative process.

In this way, the machine-learning based orchestration model can identify input data objects with low investigative potential to close before consuming excessive processing resources. In the event that the input data object does qualify for the investigative process, additional processing resources can be matched to the input data object that are tailored for the particular parameters of the input data object profile. For instance, input data object profile parameters such as, for example, the investigative score, a value score (e.g., indicative of a likelihood of a high value claim), geographic location, etc. can be matched to a predictive entity with an available skillset, location, compliance, etc. that have a historical effectiveness for the input data object profile parameters. In this way, variables, such as potential value (likelihood to have a high value claim), available skill set and location and compliance TAT's may influence the machine-learning based orchestration model on the ultimate trajectory for a particular input data object.

The machine-learning based orchestration model can manage load balancing of a plurality of input data objects by applying intelligence to large volumes of input data objects being routed, based at least in part on success criteria and available resourcing, taking into consideration any compliance requirements. The machine-learning based orchestration model can take into account available and forecasted input data objects.

The machine-learning based orchestration model can include any type of machine-learning based model including one or more supervised, unsupervised, and/or reinforcement learning models. In some implementations, a machine-learning based orchestration model can include a machine-learning based prediction model that is trained using one or more supervised training techniques. For instance, the machine-learning based prediction model can include one or more logistic regression models, naïve bayes models, K-nearest Neighbors, support vector machines, neural networks, classification models, and/or the like.

The machine-learning based orchestration model can be trained using supervised training techniques based at least in part on a historical optimization data object. For instance, the machine-learning based orchestration model can be previously trained to intelligently route an input data object through a data processing scheme using the historical optimization data object and an orchestration optimization metric. The historical optimization data object can include feedback from the operation of the machine-learning based orchestration model. As the machine-learning based orchestration model develops, the results and outcomes can feed back into the model in a continuous loop, so it continues to learn and develop best routing algorithms. The feedback loop can also plug into input data object generating analytics to improve quality and identify new input data objects to investigate.

In some embodiments, the machine-learning based orchestration model can include multiple machine-learning based sub-models at least partially independently trained to optimize a different portion of an investigative process. The machine-learning based sub-models, for example, can include a first machine learning based model and a second machine-learning based model at least partially separate from the first machine learning based model. The first machine-learning based model can include a machine-learning based predictive process routing model configured to select a predictive data analysis sub-routine from a plurality of predictive data analysis sub-routines for processing the input data object profile. The second machine-learning based model can include a machine-learning based predictive placement model configured to determine the predictive entity for performing the investigative process for the input data object based at least in part on the input data object profile. Each sub-model of the machine-learning based orchestration model can be trained using different training data to optimize one or more overall loss function(s). An overall loss function, for example, can be represented by the orchestration optimization metric. In some embodiments, the first machine-learning based model and the second machine-learning based model can be at least partially jointly trained based at least in part on an orchestration optimization metric indicative of an efficiency of the investigative process.

The term "orchestration optimization metrics" may refer to a data entity that describes the performance of the machine-learning based orchestration model. The orchestration optimization metric, for example, can represent an overall loss function for the machine-learning based orchestration model such that the machine-learning based orchestration model can be trained to increase or decrease (depending on the embodiment) the orchestration optimization metric. The orchestration optimization metric can be a numerical representation or other data representation of one or more investigative goals for the machine-learning based orchestration model. The one or more investigative goals for the machine-learning based orchestration model can be based at least in part on the investigative process. In some embodiments, the one or more investigative goals can include improved processing times for input data objects (e.g., measured as a mean, median, and/or outlier processing times), and improved investigative identification accuracy of input data objects (e.g., measure by mean, median, etc. of false positives, negatives, etc.), and/or a relative value of an investigative outcome.

The orchestration optimization metric can be based at least in part on a processing time for an input data object profile, an investigative identification accuracy of the input data object profile, and/or a relative value associated with the input data object. The orchestration optimization metric can be determined based at least in part on a timeliness of identifying input data objects for an investigative process, an operational efficiency of identifying input data objects that do not qualify for the investigative process, the number and accuracy of positive identifications for input data objects that are identified for the investigative process, a value associated with an ultimate investigative outcome, and/or the like. The relative value of the input data object, for example, can be based at least in part on a comparison between a value associated with the investigative outcome and the processing time for the input data object profile.

The first machine-learning based model and/or the second machine-learning based model can be jointly trained to lower the processing time for the input data object profile and/or increase the investigative identification accuracy of the input data object profile. In addition, or alternatively, the first machine-learning based model and/or the second machine-learning based model can be jointly trained to increase an aggregate relative value for a plurality of input data objects.

The term "machine-learning based predictive process routing model" may refer to a data entity that describes parameters, hyper-parameters, and/or defined operations of a machine-learning based model (e.g., model including at least one of one or more rule-based layers, one or more layers that depend on trained parameters, etc.). The machine-learning based predictive process routing model can include a portion of the machine-learning based orchestration model that can be at least partially individually trained to intelligently route an input data object between one or more different predictive data analysis processes. For example, the machine-learning based predictive process routing model can include a machine-learning based sub-model of the machine-learning based orchestration model that is configured to select a predictive data analysis sub-routine from a plurality of predictive data analysis sub-routines for processing an input data object profile at one or more iterations of a data processing scheme.

The machine-learning based predictive process routing model can include any type of machine-learning based model including one or more supervised, unsupervised, and/or reinforcement learning models. In some implementations, a machine-learning based predictive process routing model can include a machine-learning based prediction model that is trained using one or more supervised training techniques. For instance, the machine-learning based prediction model can include one or more logistic regression models, naïve bayes models, K-nearest Neighbors, support vector machines, neural networks, classification models, and/or the like. The machine-learning based predictive process routing model can be trained using supervised training techniques based at least in part on a historical optimization data object. For instance, the machine-learning based predictive process routing model can be previously trained to intelligently route an input data object to a different predictive data analysis sub-routine based at least in part on the plurality of input data object profile parameters that are known for the input data object.

In some embodiments, the machine-learning based predictive process routing model can include an ensemble-like model that includes a plurality of different sub-models and/or branches for each respective predictive data analysis sub-routine of the plurality of predictive data analysis sub-routines. For instance, each sub-model and/or branch can be individually trained to generate a respective predicted outcome score for a respective predictive data analysis sub-routine based at least in part on a plurality of input data object profile parameters that are known for the input data object. The respective predicted outcome score can be indicative of a likelihood that the respective predictive data analysis sub-routine will either: (i) augment the input data object profile with additional input data object profile parameters, or (ii) generate a predictive outcome for the input data object that is above a threshold certainty level. The machine-learning based predictive process routing model can utilize the predictive outcome score(s) from each of the sub-model(s) and/or branch(s) to intelligently select a predictive data analysis sub-routine for processing the input data object profile that is most likely to result in a desired outcome. In the event that one or more of the predictive outcome scores do not achieve a threshold processing score, the machine-learning based predictive process routing model can determine that the input data object does not qualify for the investigative process.

The machine-learning based predictive process routing model can be trained based at least in part on the historical optimization data object. In this respect, the historical optimization data object can be indicative of an efficiency of processing one or more previously selected input data objects with each respective predictive data analysis sub-routine. In some embodiments, each sub-model and/or branch of the machine-learning based predictive process routing model can be at least partially individually trained based at least in part on a portion of the historical optimization data object associated with the respective predictive data analysis sub-routine that corresponds to the respective sub-model and/or branch.

The term "predictive data analysis sub-routine(s)" may refer to a data entity that describes parameters, hyper-parameters, and/or defined operations of a predictive analysis process. A predictive data analysis sub-routine can include an automated process for processing an input data object in an investigative process. The predictive data analysis sub-routine can include one or more different capabilities that can increase and/or decrease the predictive data analysis sub-routine's efficiency when processing different input data objects. The predictive data analysis sub-routine(s) can include any automated process, machine-learning based or otherwise, that are capable of analyzing data and outputting either additional parameters for the data and/or an indication of whether the data qualified for an investigative process. In this respect, the predictive data analysis sub-routine(s) can depend on the investigative process and/or the functionalities available to a predictive analysis computing entity.

As one example, the predictive data analysis sub-routine(s) can include a predictive data verification sub-routine, a robotic data augmentation sub-routine, predictive data augmentation sub-routine, and/or the like.

The predictive data verification sub-routine can be configured to output an investigative score for an input data object based at least in part on a completeness of an input data object profile for the input data object. For example, the predictive data verification sub-routine can include an auto-loading sub-routine configured to query one or more databases based at least in part on the input data object to populate an input data object profile with one or more available, pre-validated, input data object profile parameters. The predictive data verification sub-routine can generate an investigative score based at least in part on the one or more available, pre-validated, input data object profile parameters.

The robotic data augmentation sub-routine can be configured to output an investigative score for an input data object based at least in part on one or more initial parameters of the input data object profile. The robotic data augmentation sub-routine can include a robotic process automation that emulates a user's actions for analyzing an input data object. The robotic data augmentation sub-routine can receive an input data object profile, generate an investigative score for the input data object based at least in part on the input data object profile and output the investigative score for the input data object. In addition to the investigative score, the robotic data augmentation sub-routine can generate (i) a recommended processing orchestration action, (ii) a predicted claim value for the input data object, and/or (iii) one or more fallout reasons for the recommended processing orchestration action. The input data object profile can be augmented with each of these outputs as additional input data object profile parameters.

The predictive data augmentation sub-routine can be configured to output the investigative score for the input data object based at least in part on an inference for the input data object based at least in part on the one or more initial parameters of the input data object profile. The predictive data augmentation sub-routine can include a predictive model trained to predict an investigative score for the input data object based at least in part on the input data object profile parameters. The inferences, for example, can include predicted additional input data object profile parameters for the input data object that are not already represented by the input data object profile. The predictive data augmentation sub-routine can include a machine-learning based predictive model configured to generate one or more inferences based at least in part on the plurality of input data object profile parameters and/or historical data associated with a plurality of previously processed input data objects. The inferences, for example, can include a predicted geographic region for the input data object, a predicted OI carrier, and/or any other parameter associated with the input data object.

The predictive data augmentation sub-routine can be trained to infer whether an input data object qualifies for an investigative process in the event that the input data object profile does not include information (e.g., OI carrier information, etc. for a COB process) sufficient to make an explicit determination. The predictive data augmentation sub-routine can be trained based at least in part on historical data indicative of the qualifications of input data objects with similar input data object profile parameters, etc.

The term "machine-learning based predictive placement model" may refer to a data entity that describes parameters, hyper-parameters, and/or defined operations of a machine-learning based model (e.g., model including at least one of one or more rule-based layers, one or more layers that depend on trained parameters, etc.). The machine-learning based predictive placement model can include a portion of the machine-learning based orchestration model that can be at least partially individually trained to intelligently route an input data object that qualifies for an investigative process to a predictive entity tailored for the input data object. For example, the machine-learning based predictive placement model can include a machine-learning based sub-model of the machine-learning based orchestration model that is configured to determine a predictive entity for performing an investigative process for an input data object based at least in part on the input data object profile.

The machine-learning based predictive placement model can include any type of machine-learning based model including one or more supervised, unsupervised, and/or reinforcement learning models. In some implementations, the machine-learning based predictive placement model can include a machine-learning based prediction model that is trained using one or more supervised training techniques. For instance, the machine-learning based predictive placement model can include one or more logistic regression models, naïve bayes models, K-nearest Neighbors, support vector machines, neural networks, classification models, and/or the like. The machine-learning based predictive placement model can be trained using supervised training techniques based at least in part on a historical optimization data object. For instance, the machine-learning based predictive placement model can be previously trained to intelligently route an input data object to a different predictive entity based at least in part on the plurality of input data object profile parameters for the input data object and one or more predictive entity parameters for each of a plurality of a predictive entities.

The machine-learning based predictive placement model can be previously trained using a historical optimization data object indicative of an efficiency of processing one or more previously selected input data objects with a respective predictive entity of a plurality of predictive entities. The respective predictive entity, for example, can be associated with a plurality of respective predictive entity parameters. The historical optimization data object can be indicative of a plurality of predictive entities, a plurality of respective predictive entity parameters for each of the plurality of predictive entities, and a success rate between the plurality of predictive entities and a plurality of previously processed input data objects. A success rate can be characterized by a timeliness, accuracy, and/or proficiency of an investigative outcome determination for one or more previous input data objects processed by the plurality of predictive entities.

The machine-learning based predictive placement model can be previously trained using the historical optimization data object to determine one or more correlations between the input data object profile parameters and the predictive entity parameters to intelligently place an input data object with a predictive entity best suited for processing the input data object. In this manner, the machine-learning based predictive placement model can be trained using historic outcomes based at least in part on inputs, entity proficiency levels, savings potential, and outcome likelihood to channel input data objects to predictive entities with high likelihood of success.

The term "predictive entity" may refer to a processing entity that describes a processing agent for processing an input data object according to an investigative process. The processing agent can include a manual agent configured to manually process an input data object and/or an automated agent configured to automatically process the input data object. In some embodiments, the predictive entity can include a COB processing representative.

The term "predictive entity parameters" may refer to a data entity that describes a component of a predictive entity. The predictive entity parameters can be descriptive of a plurality of attributes for the predictive entity. The plurality of attributes, for example, can include a geographic location of the predictive entity, a skill set for the predictive entity, a proficiency of the predictive entity, and/or any other attribute that may impact an investigative process. As one example, a respective predictive entity parameter can be indicative of a geographic region associated with the predictive entity. As another example, a respective predictive entity parameter can be indicative of a skillset associated with the predictive entity.

The term "historical optimization data object" may refer to a data entity that describes historical training information for training and evaluating machine-learning based models such as those described herein. The historical optimization data object can include historical data generated by a plurality of previous iterations of the machine-learning based orchestration model and/or one or more portions thereof (e.g., the first machine-learning model, the second machine-learning model, etc.). For example, the historical data can be indicative of a plurality of previously selected historical input data objects and a plurality of historical investigative outcomes for the plurality of previously selected historical input data objects.

In some embodiments, the historical optimization data object can be indicative of a plurality of previously selected input data objects and respective historical input data object parameters for each of the one or more previously selected input data objects. In addition, the historical optimization data object can be indicative of an investigative outcome associated with each of the plurality of previously selected input data objects.

The historical optimization data object can be indicative of an efficiency of processing one or more previously selected input data objects with the machine-learning based orchestration model and/or one or more portions thereof. As an example, the historical optimization data object can be indicative of an efficiency of processing one or more previously selected input data objects with the respective predictive data analysis sub-routine. As another example, the historical optimization data object can be indicative of an efficiency of processing one or more previously selected input data objects with a respective predictive entity of a plurality of predictive entities.

The efficiency of processing a respective input data object can be represented by a timeliness, accuracy, and/or output from processing a respective input data object. For example, the efficiency of processing a respective input data object can include one or more historical metrics such as, for example, a timing metric, an accuracy metric, and/or an output metric for a respective input data object and a processing technique applied to the respective input data object. The output metric can be indicative of a usefulness of an output from a processing technique (e.g., a processing entity, a respective predictive data analysis sub-routine, etc.) in an investigative process. For instance, the output metric can indicate whether the output was or was relied upon to generate an investigative outcome. The timing metric can be indicative of a time period accounted for by the processing technique to generate the output. The accuracy metric can be indicative of whether the output of the processing technique was accurate.

The historical optimization data object can include a plurality of training pairs generated by the machine-learning based orchestration model during operation. The training pairs can include a historical input data object and a processing technique (e.g., a processing entity, a respective predictive data analysis sub-routine, etc.). A training pair can be associated with efficiency metrics as well as contextual data for the historical input data object and the processing technique. The contextual data, for example, can include one or more historical input data object profile parameters for the historical input data object. In some embodiments, the contextual data can include one or more historical predictive entity parameters for a predictive entity.

Each of the machine-learning based models described herein can be trained using a subset of the plurality of training pairs. For example, a first machine-learning based model (e.g., the machine-learning based predictive process routing model) can be trained using a first subset of the plurality of training pairs corresponding to each of the predictive data analysis sub-routines. A first training pair, for example, of the first subset of the plurality of training pairs can include a historical input data object, a historical predictive data analysis subroutine, and/or one or more metrics associated with the historical input data object and the historical predictive data analysis subroutine. The first machine-learning based model can be trained to optimize the orchestration optimization metric based at least in part on the first subset of the plurality of training pairs.

As another example, a second machine-learning based model (e.g., the machine-learning based predictive placement model) can be trained using a subset of the plurality of training pairs corresponding to each of the predictive entities. A second training pair, for example, of the second subset of the plurality of training pairs can include a historical input data object, a historical predictive entity, and/or one or more metrics associated with the historical input data object and/or the historical predictive entity. The second machine-learning based model can be trained to optimize the orchestration optimization metric based at least in part on the second subset of the plurality of training pairs.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SWIM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM FRAMEWORK

FIG. 1 is a schematic diagram of an example system architecture 100 for performing predictive data analysis operations and for performing one or more prediction-based actions (e.g., generating corresponding user interface data). The system architecture 100 includes a predictive data analysis system 101 comprising a predictive data analysis computing entity 106 configured to generate predictive outputs that can be used to perform one or more prediction-based actions. The predictive data analysis system 101 may communicate with one or more external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like). An example of a prediction that may be generated by using the system architecture 100 is to generate a predicted coordination of benefits (COB) score for a particular individual that is associated with (e.g., employed by) a particular company.

The system architecture 100 includes a storage subsystem 108 configured to store at least a portion of the data utilized by the predictive data analysis system 101. The predictive data analysis computing entity 106 may be in communication with one or more external computing entities 102. The predictive data analysis computing entity 106 may be configured to train a prediction model (e.g., feature processing machine learning models, eligibility prediction machine learning models, per-feature-type processing machine learning models, and/or cross-feature-type machine learning models) based at least in part on the training data store 122 stored in the storage subsystem 108, store trained prediction models as part of the model definition data store 121 stored in the storage subsystem 108, utilize trained models to generate predictions based at least in part on structured feature data that may be provided by an external computing entity 102, and perform prediction-based actions based at least in part on the generated predictions. The storage subsystem may be configured to store the model definition data store 121 for one or more predictive analysis models and the training data store 122 used to train one or more predictive analysis models. The predictive data analysis computing entity 106 may be configured to receive requests and/or data from external computing entities 102, process the requests and/or data to generate predictive outputs (e.g., predictive data analysis data objects), and provide the predictive outputs to the external computing entities 102. The external computing entity 102 may periodically update/provide raw input data (e.g., structured feature data) to the predictive data analysis system 101. The external computing entities 102 may further generate user interface data (e.g., one or more data objects) corresponding to the predictive outputs and may provide (e.g., transmit, send and/or the like) the user interface data corresponding with the predictive outputs for presentation to user computing entities operated by end-users.

The storage subsystem 108 may be configured to store at least a portion of the data utilized by the predictive data analysis computing entity 106 to perform predictive data analysis steps/operations and tasks. The storage subsystem 108 may be configured to store at least a portion of operational data and/or operational configuration data including operational instructions and parameters utilized by the predictive data analysis computing entity 106 to perform predictive data analysis steps/operations in response to requests. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The predictive data analysis computing entity 106 includes a predictive analysis engine 110 and a training engine 112. The predictive analysis engine 110 may be configured to perform predictive data analysis based at least in part on a received user feature data object. For example, the predictive analysis engine 110 may be configured to one or more prediction-based actions based at least in part on a fall likelihood prediction. The training engine 112 may be configured to train the predictive analysis engine 110 in accordance with the training data store 122 stored in the storage subsystem 108.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the predictive data analysis computing entity 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with a processing element 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain embodiments of the operation of the predictive data analysis computing entity 106 with the assistance of the processing element 205 and operating system.

As indicated, in one embodiment, the predictive data analysis computing entity 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining embodiments, devices, modules, functionalities, and/or similar words used herein interchangeably. For example, the external computing entity 102 may include outdoor positioning embodiments, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning embodiments can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these frameworks and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a video capture device (e.g., camera), a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

As described below, various embodiments of the present invention leverage machine-learning based techniques to make important technical contributions to data and data processing intensive investigative processes.

FIG. 4 provides a dataflow diagram 400 for intelligently processing an input data object using a machine-learning based orchestration model in accordance with some embodiments discussed herein. The dataflow diagram 400 depicts an intelligent data processing scheme for optimizing an execution of a plurality of predictive data analysis techniques. The intelligent data processing scheme can be implemented by one or more computing device(s) and/or system(s) described herein. For example, the predictive data analysis computing entity 106 can utilize the intelligent data processing scheme to overcome the various limitations with conventional disparate computer data processing techniques.

The predictive data analysis computing entity 106 can select an input data object 405 associated with an investigative process. The input data object 405, for example, can include a data entity that identifies an object of interest that may be involved in the investigative process. The investigative process can include a process in which large amounts of data is analyzed to identify an irregularity that, once identified, may be addressed.

An example investigative process can include a COB process and the input data object 405 can refer to a data entity that describes a member of interest for the COB process that may (i) have a claim and (ii) be covered by multiple policies. Other examples of investigative processes can include: (i) fraud investigations in which the input data object 405 can refer to a data entity that describes a potentially fraudulent claim, (ii) overpayment investigations in which the input data object 405 can refer to a data entity that describes a potentially unnecessary payment, and/or the like.

The input data object 405 can be selected from a plurality of similar data entities based at least in part on selection criteria 415 that identify the input data object 405 as an object of interest. This can beneficially direct machine-learning resources to a particular input data object with a higher likelihood of having an investigative outcome. For instance, in the case that the investigative process is a COB process, the input data object 405 can be selected based at least in part on claim-based information. The selection criteria 415, for example, can identify an input data object 405 that is associated with (i) a newly created claim, (ii) a probability of making a claim, (iii) a retroactive claim, and/or the like. The selection criteria 415 can include any number of different and/or additional criteria depending on the investigative process.

The predictive data analysis computing entity 106 can generate an input data object profile 420 for the input data object 405. The input data object profile 420 includes one or more initial input data object profile parameter(s) 425 of a plurality of input data object profile parameters descriptive of a plurality of attributes for the input data object 405. The input data object profile 420 can describe a data structure for storing information for an input data object 405. The input data object profile 420 can include a plurality of input data object profile parameters for the input data object 405.

The input data object profile 420 can be modified as the input data object 405 progresses through the investigative process. For example, the input data object profile 420 can be populated with one or more different input data object profile parameters at one or more iterations of the intelligent data processing scheme. In some embodiments, the input data object profile 420 can be initially populated with initial input data object profile parameters 425 and then augmented with additional input data object profile parameters.

The input data object profile parameters can be descriptive of a plurality of attributes for an input data object 405. The plurality of attributes can include one or more characteristics that may be relevant to an investigative process. In this respect, the plurality of attributes can be based at least in part on the investigative process. As an example, examples of a plurality of input data object profile parameters for a COB process can include an identification of an insurance carrier, another insurance ("OI") carrier, an OI subscriber, a member name, a state of residence, the presence of and/or names for one or more dependents, a relationship, and/or the like.

The input data object 405 can be associated with each of the input data object profile parameters, but only a subset of the parameters can be known at a given time (e.g., the initial input data object profile parameters 425 can be known at an initial time). An input data object profile 420, for example, can include a subset of known input data object profile parameters for the input data object 405. This subset can be augmented during an investigative process as additional parameters are derived for the input data object 405. At any given time, the subset of parameters stored by the input data object profile 420 can impact the efficacy of a predictive data analysis sub-routine (collectively—referred to herein as predictive data analysis sub-routines 435) in analyzing the input data object 405 for the investigative process. Knowledge of the known input data object profile parameters can be utilized by a machine-learning based orchestration model 410 to intelligently route the input data object profile 420 through the investigative process.

By way of example, the input data object profile 420 can be processed by the machine-learning based orchestration model 410 to determine whether the input data object 405 should be investigated or closed. In the event that the input data object 405 should be investigated, the machine-learning based orchestration model 410 can initiate an investigative action 445A using the input data object profile 420. In the event that the input data object 405 should not be investigated, the machine-learning based orchestration model 410 can initiate a non-investigative action 445B using the input data object profile 420.

The machine-learning based orchestration model 410 can include a machine-learned model that is trained to intelligently orchestrate the processing of data input elements for an investigative process. The machine-learning based orchestration model 410, for example, can intelligently direct the input data object 405 through a data processing scheme in an investigative process based at least in part on best predicted outcomes, resources, timelines, and/or varying capabilities of the predictive data analysis sub-routines 435 available to the data processing scheme.

The machine-learning based orchestration model 410 can leverage the input data object 405 and/or input data object profile parameters to intelligently direct the input data object profile 420 between different automated and/or manual capabilities that can process the input data object profile 420 with maximum probability of success. The machine-learning based orchestration model 410 can continually reassess the input data object profile 420 as it is augmented with additional input data object profile parameters to make a determination based at least in part on statistical learning of where best to direct the input data object profile 420 to maximize potential investigative outcomes. The machine-learning based orchestration model 410 can direct the input data object profile 420 through multiple iterations of the data processing scheme. At each iteration, the input data object profile 420 can be augmented with additional information, rescored based at least in part on the new information, and then redirected.

After each iteration, the machine-learning based orchestration model 410 can generate an investigative score of the input data object 405 and initiate a processing orchestration action 440 based at least in part on the investigative score. The processing orchestration action can be indicative of the performance of another iteration (e.g., to improve the investigative score), a determination that the input data object 405 qualifies for an investigative process (e.g., resulting in an investigative action 445A), and/or a determination that the input data object 405 does not qualify for the investigative process (e.g., resulting in a non-investigative action 445B). In this way, the machine-learning based orchestration model 410 can identify input data objects with a low investigative potential to close before consuming excessive processing resources. In the event that the input data object 405 does qualify for an investigative process, additional processing resources such as a predictive entity 455 that is tailored for the particular parameters of the input data object profile 420 can be matched to the input data object 405.

The machine-learning based orchestration model 410 can manage load balancing of a plurality of input data objects by applying intelligence to large volumes of input data objects being routed, based at least in part on success criteria and available resourcing, taking into consideration any compliance requirements. The machine-learning based orchestration model 410 can take into account available and forecasted input data objects.

The machine-learning based orchestration model 410 can include any type of machine-learning based model including one or more supervised, unsupervised, and/or reinforcement learning models. In some implementations, the machine-learning based orchestration model 410 can include a machine-learning based prediction model that is trained using one or more supervised training techniques. For instance, the machine-learning based prediction model can include one or more logistic regression models, naïve bayes models, K-nearest Neighbors, support vector machines, neural networks, classification models, and/or the like.

The machine-learning based orchestration model 410 can be trained using supervised training techniques based at least in part on a historical optimization data object 465. For instance, the machine-learning based orchestration model 410 can be previously trained to intelligently route a respective input data object through a data processing scheme using the historical optimization data object 465 and an orchestration optimization metric. The historical optimization data object 465 can include feedback from the operation of the machine-learning based orchestration model 410. For example, as the machine-learning based orchestration model 410 develops, the results and outcomes can feed back into the machine-learning based orchestration model 410 in a continuous loop such that the machine-learning based orchestration model 410 continues to learn and develop best routing algorithms. The feedback loop can also plug into input data object generating/selection analytics to improve quality and/or identify new input data objects to investigate.

The machine-learning based orchestration model 410 can include multiple machine-learning based sub-models at least partially independently trained to optimize different portions of an investigative process. The machine-learning based sub-models, for example, can include (i) a machine-learning based predictive process routing model 430 configured to select a predictive data analysis sub-routine from a plurality of predictive data analysis sub-routines 435 for processing the input data object profile 420; and (ii) a machine-learning based predictive placement model 450 configured to determine the predictive entity 455 for performing the investigative process for the input data object 405 based at least in part on the input data object profile 420. Each sub-model of the machine-learning based orchestration model 410 can be trained using different training data to optimize one or more overall loss functions.

An overall loss function, for example, can be represented by an orchestration optimization metric that describes the performance of the machine-learning based orchestration model 410. The orchestration optimization metric, for example, can represent an overall loss function for the machine-learning based orchestration model 410 such that the machine-learning based orchestration model 410 can be trained to increase or decrease (depending on the embodiment) the orchestration optimization metric. The orchestration optimization metric can be a numerical representation or other data representation of one or more investigative goals for the machine-learning based orchestration model 410.

The one or more investigative goals for the machine-learning based orchestration model 410 can be based at least in part on the investigative process. In some embodiments, the one or more investigative goals can include improved processing times for input data objects (e.g., measured as a mean, median, and/or outlier processing times) and/or improved investigative identification accuracy of input data objects (e.g., measure by mean, median, etc. of false positives, negatives, etc.). The orchestration optimization metric can be determined based at least in part on a timeliness of identifying input data objects for an investigative process, an operational efficiency of identifying input data objects that do not qualify for the investigative process, the number, accuracy, and/or value of positive identifications for input data objects that are identified for the investigative process, and/or the like.

Using the machine-learning based orchestration model 410, the predictive data analysis computing entity 106 can select from the plurality of predictive data analysis sub-routines 435, based at least in part on the one or more initial input data object profile parameters 425 for the input data object 405, a first predictive data analysis sub-routine for processing the input data object profile 420. For example, the predictive data analysis computing entity 106 can provide the input data object profile 420 to the machine-learning based orchestration model 410 for processing and at least a portion of the machine-learning based orchestration model 410 can select the first predictive data analysis sub-routine for processing the input data object profile 420.

By way of example, the machine-learning based predictive process routing model 430 can select the first predictive data analysis sub-routine. The machine-learning based predictive process routing model 430 can include a portion of the machine-learning based orchestration model 410 that can be at least partially individually trained to intelligently route the input data object 405 between one or more different predictive data analysis processes. For example, the machine-learning based predictive process routing model 430 can include a machine-learning based sub-model of the machine-learning based orchestration model 410 that is configured to select a predictive data analysis sub-routine from the plurality of predictive data analysis sub-routines 435 for processing the input data object profile 420 at one or more iterations of the data processing scheme.

A predictive data analysis sub-routine can include an automated process for processing the input data object 405 in an investigative process. Each predictive data analysis sub-routine can include one or more different capabilities that can increase and/or decrease the predictive data analysis sub-routine's efficiency when processing different input data objects. The predictive data analysis sub-routines 435 can include any automated process, machine-learning based or otherwise, that are capable of analyzing data and outputting either additional parameters for the data and/or an indication of whether the data qualifies for an investigative process (e.g., an investigative score). In this respect, the predictive data analysis sub-routines 435 can depend on the investigative process and/or the functionalities available to the predictive data analysis computing entity 106.

As one example, the predictive data analysis sub-routines 435 can include a predictive data verification sub-routine 435A, a robotic data augmentation sub-routine 435B, and/or a predictive data augmentation sub-routine 435C.

The predictive data verification sub-routine 435A can be configured to output an investigative score for the input data object 405 based at least in part on a completeness of an input data object profile 420 for the input data object 405. For example, the predictive data verification sub-routine 435A can include an autoloading sub-routine configured to query one or more databases based at least in part on the input data object 405 to populate an input data object profile 420 with one or more available, pre-validated, input data object profile parameters. The predictive data verification sub-routine 435A can generate an investigative score based at least in part on the one or more available, pre-validated, input data object profile parameters. The input data object profile 420 can be augmented with the investigative score and/or one or more reasons for the investigative score output by the predictive data verification sub-routine 435A.

The robotic data augmentation sub-routine 435B can be configured to output an investigative score for the input data object 405 based at least in part on the one or more initial input data object profile parameter(s) 425 of the input data object profile 420. The robotic data augmentation sub-routine 435B can include a robotic process automation that emulates a user's actions for analyzing an input data object 405. The robotic data augmentation sub-routine 435B can receive an input data object profile 420, generate an investigative score for the input data object 405 based at least in part on the input data object profile 420 and output the investigative score for the input data object 405. In addition to the investigative score, the robotic data augmentation sub-routine 435B can generate (i) a recommended processing orchestration action, (ii) a predicted value for the input data object 405, and/or (iii) one or more fallout reasons for the recommended processing orchestration action. The input data object profile 420 can be augmented with each of these outputs as additional input data object profile parameters.

The predictive data augmentation sub-routine 435C can be configured to output an investigative score for the input data object 405 based at least in part on an inference for the input data object 405 based at least in part on the one or more initial input data object profile parameters 425 of the input data object profile 420. The predictive data augmentation sub-routine 435C can include a predictive model trained to predict an investigative score for the input data object 405 based at least in part on the input data object profile parameters. The inferences, for example, can include predicted additional input data object profile parameters for the input data object 405 that are not previously represented by the input data object profile 420.

The predictive data augmentation sub-routine 435C can include a machine-learning based predictive model configured to generate one or more inferences based at least in part on the plurality of input data object profile parameters and/or historical data associated with a plurality of previously processed input data objects. The inferences, for example, can include a predicted geographic region, a predicted OI carrier, and/or any other parameter associated with the input data object 405. The predictive data augmentation sub-routine 435C can be trained to infer whether the input data object 405 qualifies for an investigative process in the event that the input data object profile 420 does not include information (e.g., OI carrier information, etc. for a COB process) sufficient to make an explicit determination. The predictive data augmentation sub-routine 435C can be trained based at least in part on historical data indicative of the qualifications of input data objects with similar input data object profile parameters, etc.

The machine-learning based predictive process routing model 430 can include any type of machine-learning based model including one or more supervised, unsupervised, and/or reinforcement learning models. In some implementations, the machine-learning based predictive process routing model 430 can include a machine-learning based prediction model that is trained using one or more supervised training techniques. For instance, the machine-learning based prediction model can include one or more logistic regression models, naïve bayes models, K-nearest Neighbors, support vector machines, neural networks, classification models, and/or the like. The machine-learning based predictive process routing model 430 can be trained using supervised training techniques based at least in part on the historical optimization data object 465. For instance, the machine-learning based predictive process routing model 430 can be previously trained to intelligently route the input data object 405 to a different predictive data analysis sub-routine based at least in part on the plurality of input data object profile parameters that are known for the input data object 405.

In some embodiments, the machine-learning based predictive process routing model 430 can include an ensemble-like model that includes a plurality of different sub-models and/or branches for each respective predictive data analysis sub-routine of the plurality of predictive data analysis sub-routines 435. For instance, each sub-model and/or branch can be individually trained to generate a respective predicted outcome score for a respective predictive data analysis sub-routine based at least in part on a plurality of input data object profile parameters that are known for the input data object 405. The respective predicted outcome score can be indicative of a likelihood that the respective predictive data analysis sub-routine will either: (i) augment the input data object profile 420 with additional input data object profile parameters, or (ii) generate a predictive outcome for the input data object 405 that is above a threshold certainty level. The machine-learning based predictive process routing model 430 can utilize the predictive outcome score(s) from each of the sub-model(s) and/or branch(es) to intelligently select a predictive data analysis sub-routine for processing the input data object profile 420 that is most likely to result in a desired outcome. In the event that one or more of the predictive outcome scores do not achieve a threshold, the machine-learning based predictive process routing model 430 can determine that the input data object 405 does not qualify for the investigative process. In such a case, the predictive data analysis computing entity 106, using the machine-learning based orchestration model 410, can generate a non-investigative action 445B without processing the input data object 405 with a predictive data analysis sub-routine.

The machine-learning based predictive process routing model 430 can be trained based at least in part on the historical optimization data object 465. In this respect, the historical optimization data object 465 can be indicative of an efficiency of processing one or more previously selected input data objects with each respective predictive data analysis sub-routine. In some embodiments, each sub-model and/or branch of the machine-learning based predictive process routing model 430 can be at least partially individually trained based at least in part on a portion of the historical optimization data object 465 associated with the respective predictive data analysis sub-routine that corresponds to the respective sub-model and/or branch.

The machine-learning based predictive process routing model 430 can select a predictive data analysis sub-routine for processing the input data object profile 420 at each iteration of an investigative process. At one or more of the iterations, additional parameters can be generated for the input data object profile 420 which can guide the selection of a predictive analysis sub-routine for the next iteration.

FIG. 5 provides an operational example of a process 500 for iteratively processing an input data object using machine-learning based models in accordance with some embodiments discussed herein. The process 500 includes three iterations of an investigative process including a first iteration 505, a second iteration 510, and a third iteration 515. The three iterations are provided as one example of the iterative process for illustrative purposes. Any number of iterations can be performed to implement the investigative process.

At the first iteration 505, a plurality of initial input data object profile parameters 425 are received. By way of example, for a COB process, the initial input data object profile parameters 425 can include one or more policy parameter(s) 425A indicative of one or more explanation of benefits ("EOB") and/or COB indicators, one or more third-party credentialing response(s) 425B (e.g., a Council for Affordable Quality Healthcare® (CAQH) response), one or more rule-based parameter(s) 425C generated for the input data object based at least in part on one or more automated rules (e.g., during one or more previous iterations of an investigative process, etc.), one or more model-based parameter(s) 425D generated for the input data object based at least in part on one or more machine-learning based models (e.g., during one or more previous iterations of an investigative process, etc.), and/or one or more query-based parameter(s) 425E provided for the input data object through an initial query.

At the first iteration 505, the machine-learning based predictive process routing model 430 can select a first predictive data analysis sub-routine for processing the input data object profile 420 based at least in part on the plurality of initial input data object profile parameters 425. The predictive data analysis computing entity 106 can compute, using the first predictive data analysis sub-routine: (i) an investigative score for the input data object and (ii) at least one additional input data object profile parameter for the input data object profile.

By way of example, the machine-learning based predictive process routing model 430 can select the predictive data verification sub-routine 435A. The predictive data verification sub-routine 435A can be utilized to process the plurality of initial input data object profile parameters 425 to generate an investigative score and/or one or more first iteration additional input data object profile parameters 520. The first iteration additional input data object profile parameters 520, for example, can include an investigative score 520A from the previous sub-routine (e.g., predictive data verification sub-routine 435A). The investigative score 520A can include contextual data such as, for example, one or more failure and/or success reasons associated with the investigative score. In addition, or alternatively, the first iteration additional input data object profile parameters 520 can include one or more additional and/or flagged attributes 520B of the input data object profile. The one or more additional and/or flagged attributes 520B can include one or more relevant attributes for an investigative process such as, for example, an OI Subscriber ID or an OI carrier name for a COB process. The input data object profile can be augmented with the first iteration additional input data object profile parameters 520.

At the second iteration 510, the machine-learning based predictive process routing model 430 can select a second predictive data analysis sub-routine for processing the input data object profile 420 based at least in part on the plurality of initial input data object profile parameters 425 and the first iteration additional input data object profile parameters 520. The predictive data analysis computing entity 106 can compute, using the second predictive data analysis sub-routine, (i) an investigative score for the input data object and (ii) at least one additional input data object profile parameter for the input data object profile.

By way of example, the machine-learning based predictive process routing model 430 can select the robotic data augmentation sub-routine 435B. The robotic data augmentation sub-routine 435B can be utilized to process the plurality of initial input data object profile parameters 425 and the first iteration additional input data object profile parameters 520 to generate an investigative score and/or one or more second iteration additional input data object profile parameters 525. The second iteration additional input data object profile parameters 525, for example, can include an investigative score 525A from the previous sub-routine (e.g., robotic data augmentation sub-routine 435B). The investigative score 525A can include contextual data such as, for example, one or more failure and/or success reasons associated with the investigative score. In addition, or alternatively, the second iteration additional input data object profile parameters 525 can include one or more additional and/or flagged attributes 525B of the input data object profile. The one or more additional and/or flagged attributes 525B can include one or more relevant attributes for an investigative process such as, for example, a previous investigation result, an input data object value, etc. for a COB process. The input data object profile can be augmented with the second iteration additional input data object profile parameters 525.

The process 500 can continue for a plurality of iterations until an investigative outcome is computed for the input data object. In some embodiments, as described herein, an investigative score for the input data object can be computed that qualifies the input data object profile for further processing by a predictive entity 455. In such a case, the machine-learning based predictive process routing model 430 can provide the input data object profile to the machine-learning based predictive placement model 450.

Turning back to FIG. 4, the predictive data analysis computing entity 106 can initiate, using the machine-learning based orchestration model 410, a processing orchestration action 440. The processing orchestration action 440 can include an investigative action 445A, a non-investigative action 445B, and/or a continue processing action. The investigative action 445A, for example, can include assigning a case identifier to the input data object profile 420 and providing the input data object profile 420 to a predictive entity 455 for further processing. The non-investigative action 445B can include halting the data processing scheme for the input data object 405 and/or closing a case associated with the input data object 405. The continue processing action can include selecting from the plurality of predictive data analysis sub-routines 435, based at least in part on the one or more initial input data object profile parameters 425 and at least one additional input data object profile parameter, a second predictive data analysis sub-routine for processing the input data object profile 420 as described with respect to FIG. 5.

The processing orchestration action 440 can be based at least in part on an investigative score and/or the input data object profile parameters (e.g., the initial input data object profile parameter(s) 425 and/or any additional input data object profile parameter(s) as described in FIG. 5) for the input data object profile 420.

By way of example, in some embodiments, the processing orchestration action can be based at least in part on a threshold investigative score. The threshold investigative score can be indicative of a particular investigative score (e.g., a 50%, 70%, etc.) that has an acceptable likelihood of returning an investigative outcome through an investigative process. The threshold investigative score can include a static and/or dynamic score. By way of example, the threshold investigative score can be determined based at least in part on a historical likelihood of receiving an investigative outcome for previously scored input data objects.

In the event that the investigative score for the input data object profile 420 does not achieve the threshold investigative score, the machine-learning based orchestration model 410 can determine that the input data object 405 does not qualify (e.g., has a low likelihood of receiving an investigative outcome) for an investigative process. In the event that the investigative score for the input data object profile 420 does achieve the threshold investigative score, the machine-learning based orchestration model 410 can determine that the input data object 405 qualifies (e.g., has an acceptable likelihood of receiving an investigative outcome) for an investigative process.

Responsive to the investigative score not achieving the threshold investigative score, the machine-learning based orchestration model 410 can generate either a non-investigative action 445B or a continue processing action. In the event that the machine-learning based orchestration model 410 computes the continue processing action, the machine-learning based orchestration model 410 can select from the plurality of predictive data analysis sub-routines 435, based at least in part on the one or more initial input data object profile parameters 425 and/or one or more additional input data object profile parameters, a second predictive data analysis sub-routine for processing the input data object profile 420 as described herein with respect to FIG. 5.

Responsive to the investigative score achieving the threshold investigative score, the machine-learning based orchestration model 410 can generate an investigative action 445A. The investigative action 445A can include determining, based at least in part on the investigative score and the input data object profile 420 for the input data object 405, using the machine-learning based orchestration model 410, a predictive entity 455 for performing the investigative process for the input data object 405. In this manner, in the event that the input data object 405 does qualify for an investigative process, additional processing resources can be matched to the particular input data object that are tailored for the particular parameters of the input data object profile 420.

The predictive entity 455 can be selected by at least a portion of the machine-learning based orchestration model 410. For example, in response to a determination of an investigative action 445A, the machine-learning based predictive placement model 450 can determine the predictive entity 455 for performing the investigative process for the input data object 405.

The predictive entity 455 can include a processing agent for processing the input data object 405 according to an investigative process. The processing agent can include a manual agent configured to manually process an input data object 405 and/or an automated agent configured to automatically process the input data object 405. In some embodiments, the predictive entity 455 can include a COB processing representative such as, for example, an agent for an insurer. The predictive entity 455 can be associated with a plurality of predictive entity parameters 460. The predictive entity parameters 460 can be descriptive of a plurality of attributes for the predictive entity 455. The plurality of attributes, for example, can include a geographic location of the predictive entity 455, a skill set for the predictive entity 455, a proficiency of the predictive entity 455, and/or any other attribute that may impact an investigative process. As one example, a respective predictive entity parameter can be indicative of a geographic region associated with the predictive entity 455. As another example, a respective predictive entity parameter can be indicative of a skillset associated with the predictive entity 455.

With reference to FIG. 5, the machine-learning based predictive placement model 450 can determine the predictive entity 455 for performing the investigative process for the input data object 405 based at least in part on the initial input data object profile parameters 425 and at least one additional input data object profile parameters generated for the input data object during previous iterations of the investigative process. By way of example, the machine-learning based predictive placement model 450 can determine the predictive entity 455 based at least in part on the first iteration additional input data object profile parameters 520 and/or the second iteration additional input data object profile parameters 525.

Turning back to FIG. 4, the machine-learning based predictive placement model 450 can include a portion of the machine-learning based orchestration model 410 that can be at least partially individually trained to intelligently route an input data object 405 that qualifies for an investigative process to a predictive entity 455 tailored for the input data object 405. For example, the machine-learning based predictive placement model 450 can include a machine-learning based sub-model of the machine-learning based orchestration model 410 that is configured to determine a predictive entity 455 for performing an investigative process for an input data object 405 based at least in part on the input data object profile 420.

The machine-learning based predictive placement model 450 can include any type of machine-learning based model including one or more supervised, unsupervised, and/or reinforcement learning models. In some implementations, the machine-learning based predictive placement model 450 can include a machine-learning based prediction model that is trained using one or more supervised training techniques. For instance, the machine-learning based predictive placement model 450 can include one or more logistic regression models, naïve bayes models, K-nearest Neighbors, support vector machines, neural networks, classification models, and/or the like. The machine-learning based predictive placement model 450 can be trained using supervised training techniques based at least in part on the historical optimization data object 465. For instance, the machine-learning based predictive placement model 450 can be previously trained to intelligently route the input data object 405 to a different predictive entity 455 based at least in part on the plurality of input data object profile parameters of the input data object profile 420 and/or one or more predictive entity parameters 460 for each of a plurality of a predictive entities.

The machine-learning based predictive placement model 450 can be previously trained using the historical optimization data object 465. The historical optimization data object 465 can be indicative of an efficiency of processing one or more previously selected input data objects with a respective predictive entity of a plurality of predictive entities. The respective predictive entity, for example, can be associated with a plurality of respective predictive entity parameters. The historical optimization data object 465 can be indicative of a plurality of predictive entities, a plurality of respective predictive entity parameters for each of the plurality of predictive entities, and a success rate between the plurality of predictive entities and a plurality of previously processed input data objects. The success rate can be characterized by a timeliness, accuracy, and/or proficiency of an investigative outcome determination for one or more previous input data objects processed by the plurality of predictive entities.

The machine-learning based predictive placement model 450 can be previously trained using the historical optimization data object 465 to determine one or more correlations between the input data object profile parameters of the input data object profile 420 and the predictive entity parameters 460 of the predictive entity 455 to intelligently place the input data object 405 with the predictive entity 455 best suited for processing the input data object 405. In this manner, the machine-learning based predictive placement model 450 can be trained using historic outcomes based at least in part on inputs, entity proficiency levels, savings potential, and outcome likelihood to channel input data objects to predictive entities with high likelihood of success. For instance, input data object profile parameters such as, for example, an investigative score, a value score (e.g., indicative of a likelihood of a high value claim), geographic location, etc. can be matched to a predictive entity 455 with an available skillset, location, compliance, etc. that have a historical effectiveness for the input data object profile parameters. In this way, variables, such as potential value (likelihood to have a high value claim), available skillset and location and compliance turnaround times may influence the machine-learning based orchestration model 410 on the ultimate trajectory for the input data object 405.

Responsive to determining the predictive entity 455 for performing the investigative process for the input data object 405, the predictive data analysis computing entity 106 can provide the input data object profile 420 to the predictive entity 455. The predictive entity 455 can process the input data object profile 420 for the input data object 405 to determine an investigative outcome for the input data object. The predictive data analysis computing entity 106 can receive the investigative outcome from the predictive entity 455.

The investigative outcome can be representative of the ultimate result of the investigative process and can depend on the investigative process. Examples of investigative outcomes can include an indication of which policy is a primary or secondary policy for the input data object 405, an indication of whether fraud occurred for the input data object 405, an indication of overpayment for the input data object 405, etc. By way of example, the investigative process can include a COB process and the investigative outcome can include an indication of a primary and/or secondary policy of the input data object 405.

In addition to the ultimate result for the investigative process, in some embodiments, the investigative outcome can be indicative of an efficiency for investigative process including, for example, an efficiency for the machine-learning based orchestration model 410, an efficiency for the machine-learning based predictive process routing model 430, an efficiency for the machine-learning based predictive placement model 450, and/or an efficiency for the predictive entity 455. As one example, the investigative outcome can include and/or be associated with an orchestration optimization metric and/or one or more components thereof. The investigative outcome can be stored as a portion of the historical optimization data object 465 and utilized to train the machine-learning based orchestration model 410 and/or one or more portions thereof.

By way of example, the historical optimization data object 465 can include historical training information for training and evaluating machine-learning based models described herein such as, for example, the machine-learning based orchestration model 410, the machine-learning based predictive process routing model 430, and/or the machine-learning based predictive placement model 450. The historical optimization data object 465 can be indicative of an efficiency of processing one or more previously selected input data objects with the machine-learning based models. As an example, the historical optimization data object 465 can be indicative of an efficiency of processing one or more previously selected input data objects with a respective predictive data analysis sub-routine. As another example, the historical optimization data object 465 can be indicative of an efficiency of processing one or more previously selected input data objects with a respective predictive entity of a plurality of predictive entities.

The efficiency of processing a respective input data object can be represented by a timeliness, accuracy, and/or output from processing a respective input data object. For example, the efficiency of processing a respective input data object can include a timing metric, an accuracy metric, and/or an output metric for a respective input data object and a processing technique applied to the respective input data object. The output metric can be indicative of a usefulness of an output from a processing technique (e.g., a processing entity, a respective predictive data analysis sub-routine, etc.) in an investigative process. For instance, the output metric can indicate whether the output was or was relied upon to generate the investigative outcome. The timing metric can be indicative of a time period accounted for by the processing technique to generate the output. The accuracy metric can be indicative of whether the output of the processing technique was accurate.

The historical optimization data object 465 can include a plurality of training pairs generated by the machine-learning based orchestration model 410 during one or more iterations of operation. The training pairs can include a historical input data object and a processing technique (e.g., a processing entity, a respective predictive data analysis sub-routine, etc.). A training pair can be associated with efficiency metrics as well as contextual data for the historical input data object and the processing technique. The contextual data, for example, can include one or more historical input data object profile parameters for the historical input data object. In some embodiments, the contextual data can include one or more historical predictive entity parameters for a predictive entity.

Each of the machine-learning based models described herein can be trained using a subset of the plurality of training pairs. For example, the machine-learning based predictive process routing model 430 can be trained using a subset of the plurality of training pairs corresponding to each of the predictive data analysis sub-routines. As another example, the machine-learning based predictive placement model 450 can be trained using a subset of the plurality of training pairs corresponding to each of the predictive entities.

The predictive data analysis computing entity 106 can be configured to augment the historical optimization data object 465 at one or more different iterations of the operation of the machine-learning based orchestration model 410 to continuously populate the historical optimization data object 465 in a continuous feedback loop. For example, predictive data analysis computing entity 106 can augment the historical optimization data object 465 with the input data object 405, an investigative score, and an identification of and at least one additional input data object profile parameter generated by a predictive analysis sub-routine executed at each iteration of the investigative process. In addition, or alternatively, the predictive data analysis computing entity 106 can receive an investigative outcome from the predictive entity 455 and augment the historical optimization data object 465 with the input data object 405, the predictive entity 455, and the investigative outcome.

The predictive data analysis computing entity 106 can train the machine-learning based orchestration model 410, the machine-learning based predictive process routing model 430, and/or the machine-learning based predictive placement model 450 by the updating one or more parameters for the machine-learning based models based at least in part on historical optimization data object 465. For instance, the parameters of the machine-learning based predictive process routing model 430 can be updated based at least in part on the historical optimization data object 465 after being augmented with the input data object 405, an investigative score, and an identification of and at least one additional input data object profile parameter generated by a predictive analysis sub-routine executed at each iteration of the investigative process. In addition, or alternatively, the parameters of the machine-learning based predictive placement model 450 can be updated based at least in part on the historical optimization data object 465 after being augmented with the input data object 405, the predictive entity 455, and the investigative outcome.

With reference to FIG. 5, each portion (e.g., machine-learning based predictive process routing model 430, the machine-learning based predictive placement model 450, etc.) of the machine-learning based orchestration model 410 can be trained independently and, in some embodiments, jointly using an overall loss function. The overall loss function can be represented by the orchestration optimization metric 530 which can ensure that the machine-learning based predictive process routing model 430 and the machine-learning based predictive placement model 450 are trained to ultimately improve investigative metrics for an investigative process. Success variables for orchestration optimization metric 530 can include (i) a proximity of a predicted input data object value to an actual value for the input data object, (ii) a minimal number of processing iterations taken to achieve an investigative outcome, (iii) a compatibility between a selected predictive entity and the input data object, (iv) a low time period for achieving the investigative outcome, (v) a compliance with one or more different regulatory criteria, and/or the like.

FIG. 6 provides an operational example 600 for intelligently processing an input data object using a machine-learning based orchestration model in accordance with some embodiments discussed herein. The operational example 600 includes one example investigative processing scenario for an input data object using the machine-learning based orchestration model 410. The example investigative processing scenario can include one of a plurality of different processing scenarios based at least in part on the investigative process and the input data object. Advantageously, the machine-learning based orchestration model 410 of the present disclosure can be utilized to intelligently route an input data object through any of the operations/steps of the operational example 600 and/or any alternative/additional steps depending on the investigative process and the input data object.

At operation/step 601, the machine-learning based orchestration model 410 can process an input data object profile with a first predictive data analysis sub-routine. The first predictive data analysis sub-routine can include a predictive data verification sub-routine configured to output an investigative score for the input data object based at least in part on a completeness of an input data object profile for the input data object.

At operation/step 602, the machine-learning based orchestration model 410 can receive the investigative score for the input data object. The investigative score for the input data object can include an indication for failing to qualify the input data object.

At operation/step 603, the machine-learning based orchestration model 410 can analyze the input data object profile to determine whether the input data object profile includes data available for another predictive data analysis sub-routine. In the event that the input data object profile does not include data available for another predictive data analysis sub-routine, the machine-learning based orchestration model 410 can proceed to operation/step 604.

At operation/step 604, the machine-learning based orchestration model 410 can determine whether additional data can be generated (e.g., identified from one or more records, predicted based at least in part on available data, etc.) for the input data object profile. In the event that additional data is not available, the machine-learning based orchestration model 410 can proceed to operation/step 607.

In the event that the input data object profile does include data available for another predictive data analysis sub-routine at operation/step 603 or that additional data is available at operation/step 604, the machine-learning based orchestration model 410 can provide the input data object profile to a second predictive data analysis sub-routine.

At operation/step 605, the machine-learning based orchestration model 410 can process an input data object profile with a second predictive data analysis sub-routine. The second predictive data analysis sub-routine can include a robotic data augmentation sub-routine and/or a predictive data augmentation sub-routine configured to output another investigative score for the input data object. Based at least in part on the investigative score, the machine-learning based orchestration model 410 can generate an investigative action, a non-investigative action, and/or a continue processing action for the input data object. In the event of a non-investigative action, the machine-learning based orchestration model 410 can halt the data processing scheme for the input data object and/or close a case associated with the input data object. In the event of an investigative action, the machine-learning based orchestration model 410 can assign a case identifier to the input data object profile and either: (i) certify a claim associated with the input data object, or (ii) provide the input data object profile of the input data object to a predictive entity for further processing at operation/step 607.

At step/operation 607, the machine-learning based orchestration model 410 can generate a predicted probability of success based at least in part on the investigative scores for the input data object. In the event that the predicted probability of success is above a threshold investigative score, the machine-learning based orchestration model 410 can determine whether the input data object is associated with a claim lead or a member lead.

If the input data object is associated with a claim lead, the machine-learning based orchestration model 410 can, at step/operation 608, determine a claim-based investigative outcome for the input data object. At step/operation 610, the machine-learning based orchestration model 410 can queue the input data object for further processing. The input data object can be queued with a plurality of input data objects and load balanced based at least in part on potential value. In some embodiments, the input data object can be loaded to a just-in-time (JIT) system with an indicator indicative of the claims-based investigative outcome.

If the input data object is associated with a member lead, the machine-learning based orchestration model 410 can, at step/operation 611, determine a member-based investigative outcome for the input data object. At step/operation 612, the machine-learning based orchestration model 410 can match the input data object with a predictive entity for further processing based at least in part on a location of the predictive entity. At step/operation 613, the machine-learning based orchestration model 410 can match the input data object with a predictive entity for further processing based at least in part on a skillset of the predictive entity.

FIG. 7 provides a flowchart diagram of an example process 700 for intelligently processing an input data object using a machine-learning based orchestration model in accordance with some embodiments discussed herein. Via the various steps/operations of the process 700, the predictive data analysis computing entity 106 can implement an intelligent data processing pipeline to overcome the various limitations with conventional disparate computer data processing techniques.

At step/operation 701, the process 700 includes identifying an input data object. For example, the predictive data analysis computing entity 106 can identify the input data object based at least in part on one or more selection criteria as described herein. The predictive data analysis computing entity, for example, can select an input data object associated with an investigative process based at least in part on the one or more selection criteria. The input data object can be identified/selected based at least in part on analytics driven selection criteria based at least in part on savings/recovery potential for an investigative process.

At step/operation 702, the process 700 includes generating an input data object profile for the input data object. For example, the predictive data analysis computing entity 106 can generate the input data object profile for the input data object. The input data object profile can include a plurality of input data object profile parameters for the input data object. The input data object profile, for example, can include one or more initial input data object profile parameters of a plurality of input data object profile parameters descriptive of a plurality of attributes for the input data object. In some embodiments, a predictive data analysis sub-routine such as, for example, a predictive data verification sub-routine can generate the input data object profile by receiving the plurality of input data object profile parameters from one or more accessible databases.

At step/operation 703, the process 700 includes dynamically routing the input data object profile to a predictive data analysis sub-routine. For example, the predictive data analysis computing entity 106 can dynamically route the input data object profile to the predictive data analysis sub-routine. In some embodiments, the machine-learning based orchestration model and/or a portion thereof can assess input data object profile to determine a selected predictive data analysis sub-routine based at least in part on data available and missing data. The predictive data analysis computing entity 106 can select from a plurality of predictive data analysis sub-routines, based at least in part on the one or more initial input data object profile parameters and using a machine-learning based orchestration model, a first predictive data analysis sub-routine for processing the input data object profile.

At step/operation 704, the process 700 includes determining an investigability of the input data object profile based at least in part on the input data object profile. For example, the predictive data analysis computing entity 106 can determine the investigability of the input data object profile based at least in part on the input data object profile. For instance, the input data object profile can be augmented with data collected throughout each iteration of the investigative process of step/operation 703 to enrich the record and determine a next best capability. By way of example, the predictive data analysis computing entity 106 can compute, using the first predictive data analysis sub-routine, (i) an investigative score for the input data object and (ii) at least one additional input data object profile parameter for the input data object profile. The investigability of the input data object profile based at least in part on the (i) an investigative score for the input data object and (ii) at least one additional input data object profile parameter for the input data object profile.

The predictive data analysis computing entity 106 can initiate, based at least in part on the investigative score and the at least one additional input data object profile parameter, using the machine-learning based orchestration model, a processing orchestration action for the input data object profile. In the event of an investigative score that is below a threshold, the predictive data analysis computing entity 106 can return to step/operation 703 and select, using the machine-learning based orchestration model, a second predictive data analysis sub-routine from the plurality of predictive data analysis sub-routines based at least in part on the one or more initial input data object profile parameters and the at least one additional input data object profile parameter. This can continue until the investigative score achieves the threshold or the input data object is identified as an irrelevant input data object.

At step/operation 705, the process 700 includes generating an investigative outcome for the input data object. For example, the predictive data analysis computing entity 106 can generate the investigative outcome for the input data object. As an example, predictive data analysis computing entity 106 can utilize a machine-learning based predictive placement model to determine a likelihood of a claims-based investigative outcome and/or a member-based investigative outcome. In the event of a member-based investigative outcome, the machine-learning based predictive placement model can determine a predictive entity and/or a predictive entity location for assigning the input data object. For example, the predictive data analysis computing entity 106 can determine, based at least in part on the investigative score and the input data object profile for the input data object, using the machine-learning based orchestration model, a predictive entity for performing the investigative process for the input data object.

At step/operation 706, the process 700 includes providing one or more outputs to a machine-learning based model in a feedback loop. For example, the predictive data analysis computing entity 106 can provide the one or more outputs to a machine-learning based model in a feedback loop to train the machine-learning based model from outcomes to re-score and determine the next step to rerouting.

For example, the predictive data analysis computing entity 106 can augment a historical optimization data object with the input data object, one or more investigative score (s), and the at least one additional input data object profile parameter and update the one or more parameters for a machine-learning based model based at least in part on the augmented historical optimization data object. As another example, the predictive data analysis computing entity 106 can receive an investigative outcome from a predictive entity, augment a historical optimization data object with the input data object, the predictive entity, and the investigative outcome, and update one or more parameters for a machine-learning based model based at least in part on the augmented historical optimization data object.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for optimizing an execution of a plurality of predictive data analysis sub-routines, the computer-implemented method comprising:
   generating, by one or more processors, an input data object profile for an input data object associated with an investigative process, wherein the input data object profile comprises one or more initial input data object profile parameters of a plurality of input data object profile parameters that describe a plurality of attributes for the input data object;
   selecting, by the one or more processors and using a machine-learning based orchestration model, a first predictive data analysis sub-routine from the plurality of predictive data analysis sub-routines based at least in part on the one or more initial input data object profile parameters;
   generating, by the one or more processors and using the first predictive data analysis sub-routine, (i) an investigative score for the input data object and (ii) at least one additional input data object profile parameter for the input data object profile; and
   initiating, based at least in part on the investigative score and the at least one additional input data object profile parameter, by the one or more processors and using the machine-learning based orchestration model, a processing orchestration action, the processing orchestration action comprising at least one of:
   (i) selecting, by the one or more processors and using the machine-learning based orchestration model, a second predictive data analysis sub-routine from the plurality of predictive data analysis sub-routines based at least in part on the one or more initial input data object profile parameters and the at least one additional input data object profile parameter, or
   (ii) determining, based at least in part on the investigative score and the input data object profile for the input data object, by the one or more processors and using the machine-learning based orchestration model, a predictive entity for performing the investigative process for the input data object.

2. The computer-implemented method of claim 1, wherein the machine-learning based orchestration model comprises:
   (i) a machine-learning based predictive process routing model configured to select a predictive data analysis sub-routine from the plurality of predictive data analysis sub-routines for processing the input data object profile, and
   (ii) a machine-learning based predictive placement model configured to determine the predictive entity for performing the investigative process for the input data object based at least in part on the input data object profile.

3. The computer-implemented method of claim 2, wherein the machine-learning based predictive process routing model comprises a separate branch for each respective predictive data analysis sub-routine of the plurality of predictive data analysis sub-routines, wherein the separate branch is previously trained using a historical optimization data object indicative of an efficiency of processing one or more previously selected input data objects with the respective predictive data analysis sub-routine.

4. The computer-implemented method of claim 3, wherein the historical optimization data object is indicative of one or more respective historical input data object parameters for each of the one or more previously selected input data objects.

5. The computer-implemented method of claim 3, wherein the computer-implemented method further comprises:
   augmenting, by the one or more processors, the historical optimization data object with the input data object, the investigative score, and the at least one additional input data object profile parameter to generate an augmented historical optimization data object; and
   updating, by the one or more processors, one or more parameters for the machine-learning based predictive process routing model based at least in part on the augmented historical optimization data object.

6. The computer-implemented method of claim 2, wherein the machine-learning based predictive placement model is previously trained using a historical optimization data object indicative of an efficiency of processing one or more previously selected input data objects with a respective predictive entity of a plurality of predictive entities.

7. The computer-implemented method of claim 6, wherein the respective predictive entity is associated with a plurality of respective predictive entity parameters, and wherein the historical optimization data object is indicative of the plurality of respective predictive entity parameters.

8. The computer-implemented method of claim 7, wherein a respective predictive entity parameter of the plurality of respective predictive entity parameters is indicative of a geographic region associated with the predictive entity.

9. The computer-implemented method of claim 6, wherein the computer-implemented method further comprises:
   responsive to computing the predictive entity for performing the investigative process for the input data object, providing, by the one or more processors, the input data object profile to the predictive entity;
   receiving, by the one or more processors, an investigative outcome from the predictive entity, wherein the investigative outcome is indicative of an efficiency for the predictive entity;
   augmenting, by the one or more processors, the historical optimization data object with the input data object, the predictive entity, and the investigative outcome to generate an augmented historical optimization data object; and
   updating, by the one or more processors, one or more parameters for the machine-learning based predictive placement model based at least in part on the augmented historical optimization data object.

10. The computer-implemented method of claim 1, wherein the plurality of predictive data analysis sub-routines comprises at least one of:
   (i) a predictive data verification sub-routine configured to output the investigative score for the input data object based at least in part on a completeness of the input data object profile,
   (ii) a robotic data augmentation sub-routine configured to output the investigative score for the input data object based at least in part on the one or more initial input data object profile parameters of the input data object profile, or
   (iii) a predictive data augmentation sub-routine configured to output the investigative score for the input data object based at least in part on an inference for the input data object based at least in part in the one or more initial input data object profile parameters of the input data object profile.

11. The computer-implemented method of claim 1, wherein the processing orchestration action is based at least in part on a threshold investigative score.

12. The computer-implemented method of claim 11, wherein, responsive to the investigative score not achieving the threshold investigative score, the computer-implemented method further comprises:
   selecting, by the one or more processors and using the machine-learning based orchestration model, the second predictive data analysis sub-routine from the plurality of predictive data analysis sub-routines based at least in part on the one or more initial input data object profile parameters and the at least one additional input data object profile parameter.

13. The computer-implemented method of claim 11, wherein responsive to the investigative score achieving the threshold investigative score, the computer-implemented method further comprises:
   determining, based at least in part on the investigative score and the input data object profile for the input data object, by the one or more processors and the machine-learning based orchestration model, the predictive entity for performing the investigative process for the input data object.

14. A system for optimizing an execution of a plurality of predictive data analysis sub-routines, the system comprising at least one processor and at least one memory including program code, the at least one memory and the program code configured to, with the at least one processor, cause the system to at least:
   generate an input data object profile for an input data object associated with an investigative process, wherein the input data object profile comprises one or more initial input data object profile parameters of a plurality of input data object profile parameters that describe a plurality of attributes for the input data object;
   select, using a machine-learning based orchestration model, a first predictive data analysis sub-routine from the plurality of predictive data analysis sub-routines based at least in part on the one or more initial input data object profile parameters;
   generate, using the first predictive data analysis sub-routine, (i) an investigative score for the input data object and (ii) at least one additional input data object profile parameter for the input data object profile; and
   initiate, based at least in part on the investigative score and the at least one additional input data object profile parameter, using the machine-learning based orchestration model, a processing orchestration action, the processing orchestration action comprising at least one of:
      (i) selecting, using the machine-learning based orchestration model, a second predictive data analysis sub-routine from the plurality of predictive data analysis sub-routines based at least in part on the one or more initial input data object profile parameters and the at least one additional input data object profile parameter, or
      (ii) determining, based at least in part on the investigative score and the input data object profile for the input data object, using the machine-learning based orchestration model, a predictive entity for performing the investigative process for the input data object.

15. The system of claim 14, wherein the machine-learning based orchestration model comprises:
(i) a machine-learning based predictive process routing model configured to select a predictive data analysis sub-routine from the plurality of predictive data analysis sub-routines for processing the input data object profile, and
(ii) a machine-learning based predictive placement model configured to determine the predictive entity for performing the investigative process for the input data object based at least in part on the input data object profile.

16. The system of claim 15, wherein the machine-learning based predictive process routing model comprises a separate branch for each respective predictive data analysis sub-routine of the plurality of predictive data analysis sub-routines, wherein the separate branch is previously trained using a historical optimization data object indicative of an efficiency of processing one or more previously selected input data objects with the respective predictive data analysis sub-routine.

17. The system of claim 16, wherein the processing orchestration action is based at least in part on a threshold investigative score.

18. The system of claim 17, wherein:
responsive to the investigative score not achieving the threshold investigative score, the system is caused to at least:
select, using the machine-learning based orchestration model, the second predictive data analysis sub-routine from the plurality of predictive data analysis sub-routines based at least in part on the one or more initial input data object profile parameters and the at least one additional input data object profile parameter; and
responsive to the investigative score achieving the threshold investigative score, the system is caused to at least:
determine, based at least in part on the investigative score and the input data object profile for the input data object, using the machine-learning based orchestration model, the predictive entity for performing the investigative process for the input data object.

19. A computer program product for optimizing an execution of a plurality of predictive data analysis sub-routines, the computer program product comprising at least one non-transitory computer-readable storage medium having computer-readable program code portions stored therein, the computer-readable program code portions configured to:
generate an input data object profile for an input data object associated with an investigative process, wherein the input data object profile comprises one or more initial input data object profile parameters of a plurality of input data object profile parameters that describe a plurality of attributes for the input data object;
select, using a machine-learning based orchestration model, a first predictive data analysis sub-routine from the plurality of predictive data analysis sub-routines based at least in part on the one or more initial input data object profile parameters;
generate, using the first predictive data analysis sub-routine, (i) an investigative score for the input data object and (ii) at least one additional input data object profile parameter for the input data object profile; and
initiate, based at least in part on the investigative score and the at least one additional input data object profile parameter, using the machine-learning based orchestration model, a processing orchestration action, the processing orchestration action comprising at least one of:
(i) selecting, using the machine-learning based orchestration model, a second predictive data analysis sub-routine from the plurality of predictive data analysis sub-routines based at least in part on the one or more initial input data object profile parameters and the at least one additional input data object profile parameter, or
(ii) determining, based at least in part on the investigative score and the input data object profile for the input data object, using the machine-learning based orchestration model, a predictive entity for performing the investigative process for the input data object.

20. The computer program product of claim 19, wherein the machine-learning based orchestration model comprises:
(i) a machine-learning based predictive process routing model configured to select a predictive data analysis sub-routine from the plurality of predictive data analysis sub-routines for processing the input data object profile, and
(ii) a machine-learning based predictive placement model configured to determine the predictive entity for performing the investigative process for the input data object based at least in part on the input data object profile.

* * * * *